(12) United States Patent
LeTourneau

(10) Patent No.: US 10,411,878 B2
(45) Date of Patent: *Sep. 10, 2019

(54) METHOD AND/OR SYSTEM FOR TRANSMITTING AND/OR RECEIVING DATA

(71) Applicant: Robert T. and Virginia T. Jenkins as Trustees of the Jenkins family Trust Dated Feb. 8, 2002, Sacramento, CA (US)

(72) Inventor: Jack J. LeTourneau, Ventura, CA (US)

(73) Assignees: Robert T. Jenkins, Sacramento, CA (US), Trustees of the Jenkins Family Trust dated Feb. 8, 2002; Virgina T. Jenkins, Sacramento, CA (US), Trustees of the Jenkins Family Trust dated Feb. 8, 2002

( * ) Notice: Subject to any disclaimer, the term of this patent is extended or adjusted under 35 U.S.C. 154(b) by 0 days.

This patent is subject to a terminal disclaimer.

(21) Appl. No.: 15/240,964

(22) Filed: Aug. 18, 2016

(65) Prior Publication Data

US 2016/0359616 A1    Dec. 8, 2016

Related U.S. Application Data

(63) Continuation of application No. 14/726,192, filed on May 29, 2015, now Pat. No. 9,425,951, which is a continuation of application No. 14/149,749, filed on Jan. 7, 2014, now Pat. No. 9,077,515, which is a continuation of application No. 12/613,450, filed on Nov. 5, 2009, now Pat. No. 8,650,201, which is a continuation of application No. 11/006,842, filed on Dec. 7, 2004, now Pat. No. 7,630,995.

(60) Provisional application No. 60/632,343, filed on Nov. 30, 2004.

(51) Int. Cl.
| | |
|---|---|
| G06F 17/30 | (2006.01) |
| G06F 7/00 | (2006.01) |
| H04L 7/04 | (2006.01) |
| H04L 1/00 | (2006.01) |
| H04N 19/68 | (2014.01) |

(52) U.S. Cl.
CPC ............ *H04L 7/041* (2013.01); *H04L 1/0041* (2013.01); *H04L 7/04* (2013.01); *H04N 19/68* (2014.11); *H04M 2201/22* (2013.01); *Y10S 707/99942* (2013.01)

(58) Field of Classification Search
CPC .......... H04L 7/04; H04L 7/041; H04L 7/0041
See application file for complete search history.

(56) References Cited

U.S. PATENT DOCUMENTS

| | | |
|---|---|---|
| 3,201,701 A | 8/1965 | Maitra |
| 3,704,345 A | 11/1972 | Coker |
| 4,001,951 A | 1/1977 | Fasse |

(Continued)

OTHER PUBLICATIONS

U.S. Appl. No. 14/870,744 / Non-Final Rejection, dated Aug. 24, 2017, 11 pages.

(Continued)

*Primary Examiner* — Kuen S Lu
(74) *Attorney, Agent, or Firm* — Berkeley Law & Technology Group, LLP

(57) ABSTRACT

Embodiments of a method and/or system of transmitting and/or receiving data is disclosed.

35 Claims, 8 Drawing Sheets

(56) References Cited

U.S. PATENT DOCUMENTS

| | | | |
|---|---|---|---|
| 4,134,218 A | 1/1979 | Adams et al. | |
| 4,156,910 A | 5/1979 | Barton et al. | |
| 4,286,330 A | 8/1981 | Isaacson | |
| 4,439,162 A | 3/1984 | Blaine | |
| 4,677,550 A | 6/1987 | Ferguson | |
| 4,737,109 A | 4/1988 | Abramson | |
| 4,745,561 A | 5/1988 | Hirosawa et al. | |
| 4,751,684 A | 6/1988 | Holt | |
| 4,831,525 A | 5/1989 | Saito et al. | |
| 4,867,686 A | 9/1989 | Goldstein | |
| 4,931,928 A | 6/1990 | Greenfeld | |
| 4,949,388 A | 8/1990 | Bhaskaran | |
| 4,989,132 A | 1/1991 | Mellender et al. | |
| 4,991,087 A | 2/1991 | Burkowski et al. | |
| 5,021,943 A | 6/1991 | Grimes | |
| 5,021,992 A | 6/1991 | Kondo | |
| 5,050,071 A | 9/1991 | Harris et al. | |
| 5,191,522 A | 3/1993 | Bosco et al. | |
| 5,235,701 A | 8/1993 | Ohler et al. | |
| 5,265,245 A | 11/1993 | Nordstrom et al. | |
| 5,295,261 A | 3/1994 | Simonetti | |
| 5,325,531 A | 6/1994 | McKeeman | |
| 5,335,320 A | 8/1994 | Iwata | |
| 5,335,345 A | 8/1994 | Frieder et al. | |
| 5,355,496 A | 10/1994 | Fant et al. | |
| 5,463,777 A | 10/1995 | Bialkowski et al. | |
| 5,493,504 A | 2/1996 | Minato | |
| 5,497,500 A | 3/1996 | Rogers et al. | |
| 5,509,088 A | 4/1996 | Robson | |
| 5,519,627 A | 5/1996 | Mahmood et al. | |
| 5,522,068 A | 5/1996 | Berkowitz | |
| 5,577,253 A | 11/1996 | Blickstein | |
| 5,598,350 A * | 1/1997 | Kawanishi | C12Q 1/68 382/129 |
| 5,606,669 A | 2/1997 | Bertin et al. | |
| 5,636,155 A | 6/1997 | Kabuo | |
| 5,687,362 A | 11/1997 | Bhargava et al. | |
| 5,706,406 A | 1/1998 | Pollock | |
| 5,724,512 A | 3/1998 | Winterbottom | |
| 5,724,576 A | 3/1998 | Letourneau | |
| 5,748,975 A | 5/1998 | Van De Venter | |
| 5,758,152 A | 5/1998 | LeTourneau | |
| 5,778,354 A | 7/1998 | Leslie | |
| 5,778,371 A | 7/1998 | Fujihara | |
| 5,781,906 A | 7/1998 | Aggarwal et al. | |
| 5,787,415 A | 7/1998 | Jacobson et al. | |
| 5,787,432 A | 7/1998 | Letourneau | |
| 5,796,356 A | 8/1998 | Okada et al. | |
| 5,802,370 A | 9/1998 | Sitbon et al. | |
| 5,822,593 A | 10/1998 | Lamping et al. | |
| 5,826,262 A | 10/1998 | Bui | |
| 5,848,159 A * | 12/1998 | Collins | G06Q 20/382 380/30 |
| 5,905,138 A | 5/1999 | Van Broekhoven | |
| 5,930,805 A | 7/1999 | Marquis | |
| 5,937,181 A * | 8/1999 | Godefroid | G06F 8/73 703/22 |
| 5,970,490 A | 10/1999 | Morgenstern | |
| 5,978,790 A | 11/1999 | Buneman et al. | |
| 5,987,449 A | 11/1999 | Suciu | |
| 5,999,926 A | 12/1999 | Suciu | |
| 6,002,879 A | 12/1999 | Radigan et al. | |
| 6,003,033 A | 12/1999 | Amano et al. | |
| 6,022,879 A | 2/2000 | Crow et al. | |
| 6,028,987 A | 2/2000 | Hirairi | |
| 6,055,537 A * | 4/2000 | LeTourneau | G06F 9/44 |
| 6,076,087 A | 6/2000 | Suciu | |
| 6,088,691 A | 7/2000 | Bhargava et al. | |
| 6,141,655 A * | 10/2000 | Johnson | G06F 17/30327 |
| 6,199,103 B1 | 3/2001 | Sakuguchi et al. | |
| 6,236,410 B1 | 5/2001 | Politis et al. | |
| 6,243,859 B1 | 6/2001 | Chen-Kuang | |
| 6,279,007 B1 | 8/2001 | Uppala | |
| 6,289,354 B1 | 9/2001 | Aggarwal et al. | |
| 6,292,938 B1 | 9/2001 | Sarkar et al. | |
| 6,314,559 B1 | 11/2001 | Sollich | |
| 6,336,812 B1 | 1/2002 | Cooper et al. | |
| 6,341,372 B1 | 1/2002 | Datig | |
| 6,442,584 B1 | 8/2002 | Kolli et al. | |
| 6,446,256 B1 | 9/2002 | Hyman et al. | |
| 6,466,240 B1 | 10/2002 | Maslov | |
| 6,505,205 B1 | 1/2003 | Kothuri et al. | |
| 6,542,899 B1 | 4/2003 | Saulpaugh et al. | |
| 6,550,024 B1 | 4/2003 | Pagurek et al. | |
| 6,556,983 B1 | 4/2003 | Altschuler et al. | |
| 6,598,052 B1 | 7/2003 | Saulpaugh et al. | |
| 6,606,632 B1 | 8/2003 | Saulpaugh et al. | |
| 6,606,741 B2 | 8/2003 | Kojima et al. | |
| 6,609,130 B1 | 8/2003 | Saulpaugh et al. | |
| 6,610,106 B1 | 8/2003 | Jenks | |
| 6,611,844 B1 | 8/2003 | Saulpaugh et al. | |
| 6,640,218 B1 | 10/2003 | Golding | |
| 6,658,649 B1 | 12/2003 | Bates et al. | |
| 6,691,301 B2 | 2/2004 | Bowen | |
| 6,714,939 B2 | 3/2004 | Saldanha et al. | |
| 6,728,953 B1 | 4/2004 | Walster | |
| 6,745,384 B1 | 6/2004 | Biggerstaff | |
| 6,748,378 B1 | 6/2004 | Lavender et al. | |
| 6,763,515 B1 | 7/2004 | Vazquez et al. | |
| 6,785,673 B1 * | 8/2004 | Fernandez | G06F 17/2247 |
| 6,817,865 B2 | 11/2004 | Charbonneau | |
| 6,829,695 B1 | 12/2004 | Ross | |
| 6,847,979 B2 | 1/2005 | Allemang et al. | |
| 6,854,976 B1 | 2/2005 | Suhr | |
| 6,874,005 B2 | 3/2005 | Fortenberry et al. | |
| 6,880,148 B1 | 4/2005 | Raph | |
| 6,965,990 B2 | 11/2005 | Barsness et al. | |
| 6,968,330 B2 | 11/2005 | Edwards et al. | |
| 6,978,271 B1 * | 12/2005 | Hoffman | G06F 17/30091 |
| 7,043,555 B1 | 5/2006 | McClain et al. | |
| 7,051,033 B2 | 5/2006 | Agarwal et al. | |
| 7,072,904 B2 | 7/2006 | Najork et al. | |
| 7,103,838 B1 | 9/2006 | Krishnamurthy et al. | |
| 7,107,265 B1 | 9/2006 | Calvignac et al. | |
| 7,117,196 B2 | 10/2006 | Gaur et al. | |
| 7,117,479 B2 | 10/2006 | Van De Vanter | |
| 7,127,704 B2 | 10/2006 | Van De Vanter et al. | |
| 7,134,075 B2 | 11/2006 | Hind et al. | |
| 7,140,006 B2 | 11/2006 | Harrison et al. | |
| 7,162,485 B2 | 1/2007 | Gottlob et al. | |
| 7,190,376 B1 | 3/2007 | Tonisson | |
| 7,191,182 B2 | 3/2007 | Anonsen et al. | |
| 7,203,680 B2 | 4/2007 | Parida | |
| 7,203,774 B1 | 4/2007 | Zhou et al. | |
| 7,287,026 B2 | 10/2007 | Oommen | |
| 7,313,563 B2 | 12/2007 | Bordawekar et al. | |
| 7,318,215 B1 | 1/2008 | Krishnan et al. | |
| 7,337,163 B1 | 2/2008 | Srinivasan | |
| 7,356,802 B2 | 4/2008 | de Sutter et al. | |
| 7,360,202 B1 | 4/2008 | Seshadri et al. | |
| 7,409,673 B2 | 8/2008 | Kuo et al. | |
| 7,419,376 B2 | 9/2008 | Sarvazyan et al. | |
| 7,437,666 B2 | 10/2008 | Ramarao | |
| 7,475,070 B2 | 1/2009 | Fan et al. | |
| 7,496,892 B2 | 2/2009 | Nuss | |
| 7,512,932 B2 | 3/2009 | Davidov et al. | |
| 7,536,675 B2 | 5/2009 | Gallagher | |
| 7,536,676 B2 | 5/2009 | Baker | |
| 7,544,062 B1 | 6/2009 | Hauschild et al. | |
| 7,561,927 B2 | 7/2009 | Oyama et al. | |
| 7,571,156 B1 | 8/2009 | Gupta et al. | |
| 7,571,169 B2 | 8/2009 | Jones et al. | |
| 7,574,692 B2 | 8/2009 | Herscu | |
| 7,575,434 B2 | 8/2009 | Palakodeti | |
| 7,620,632 B2 | 11/2009 | Andrews | |
| 7,627,591 B2 | 12/2009 | LeTourneau | |
| 7,630,995 B2 | 12/2009 | LeTourneau | |
| 7,636,727 B2 | 12/2009 | Schiffmann et al. | |
| 7,650,592 B2 | 1/2010 | Eckels et al. | |
| 7,669,183 B2 | 2/2010 | Bowman et al. | |
| 7,681,177 B2 | 3/2010 | LeTourneau | |
| 7,761,847 B2 | 7/2010 | Kornerup et al. | |
| 7,761,858 B2 | 7/2010 | Chang et al. | |
| 7,765,183 B2 | 7/2010 | Williams, Jr. | |

(56) References Cited

U.S. PATENT DOCUMENTS

| | | |
|---|---|---|
| 7,779,396 B2 | 8/2010 | Meijer et al. |
| 7,801,923 B2 | 9/2010 | LeTourneau |
| 7,861,304 B1 | 12/2010 | Nachenberg |
| 7,882,147 B2 | 2/2011 | LeTourneau |
| 7,890,928 B2 | 2/2011 | Patrudu |
| 7,899,821 B1 | 3/2011 | Schiffmann |
| 8,020,145 B2 | 9/2011 | Fant |
| 8,032,860 B2 | 10/2011 | Piehler et al. |
| 8,037,102 B2 | 10/2011 | LeTourneau |
| 8,060,868 B2 | 11/2011 | Meijer et al. |
| 8,112,740 B2 | 2/2012 | Meijer et al. |
| 8,151,276 B2 | 4/2012 | Grechanik |
| 8,181,155 B2 | 5/2012 | Pinto et al. |
| 8,230,526 B2 | 7/2012 | Holland et al. |
| 8,250,526 B2 | 8/2012 | Anderson et al. |
| 8,316,059 B1 | 11/2012 | Schiffmann |
| 8,356,040 B2 | 1/2013 | LeTourneau |
| 8,365,137 B2 | 1/2013 | Fant |
| 8,438,534 B2 | 5/2013 | Thomson |
| 8,443,339 B2 | 5/2013 | LeTourneau |
| 8,484,236 B1 | 7/2013 | Andrews |
| 8,626,777 B2 | 1/2014 | LeTourneau |
| 8,650,201 B2 | 2/2014 | LeTourneau |
| 8,683,431 B2 | 3/2014 | Thomson et al. |
| 8,762,942 B2 | 6/2014 | Langworthy et al. |
| 8,869,106 B2 | 10/2014 | Jazdzewski |
| 8,990,769 B2 | 3/2015 | LeTourneau |
| 9,002,862 B2 | 4/2015 | Schiffmann |
| 9,020,961 B2 | 4/2015 | LeTourneau |
| 9,043,347 B2 | 5/2015 | LeTourneau |
| 9,077,515 B2 | 7/2015 | LeTourneau |
| 9,330,128 B2 | 5/2016 | Schiffmann |
| 9,411,841 B2 | 8/2016 | Schiffmann |
| 9,425,951 B2 | 8/2016 | LeTourneau |
| 9,430,512 B2 | 8/2016 | LeTourneau |
| 9,842,130 B2 | 12/2017 | Schiffmann |
| 10,255,311 B2 | 4/2019 | LeTourneau |
| 2001/0003211 A1 | 6/2001 | Bera |
| 2002/0062259 A1 | 2/2002 | Katz et al. |
| 2002/0040292 A1 | 4/2002 | Marcu |
| 2002/0059281 A1 | 5/2002 | Watanabe et al. |
| 2002/0091676 A1 | 7/2002 | Agrawal |
| 2002/0107860 A1 | 8/2002 | Gobeille et al. |
| 2002/0129129 A1* | 9/2002 | Bloch ................. G06F 8/61 709/220 |
| 2002/0130796 A1 | 9/2002 | Tsuchido et al. |
| 2002/0130907 A1 | 9/2002 | Chi |
| 2002/0133347 A1 | 9/2002 | Schoneburg |
| 2002/0133497 A1 | 9/2002 | Draper et al. |
| 2002/0149604 A1 | 10/2002 | Wilkinson |
| 2002/0169563 A1 | 11/2002 | de Carvalho Ferreira |
| 2002/0194163 A1 | 12/2002 | Hopeman |
| 2003/0041088 A1 | 2/2003 | Wilson et al. |
| 2003/0065659 A1 | 4/2003 | Agarwal et al. |
| 2003/0074436 A1 | 4/2003 | Gieseke |
| 2003/0115559 A1 | 6/2003 | Sawada |
| 2003/0130977 A1 | 7/2003 | Oommen |
| 2003/0167445 A1 | 9/2003 | Su et al. |
| 2003/0195885 A1* | 10/2003 | Emmick ........... G06F 17/30917 |
| 2003/0195890 A1 | 10/2003 | Oommen |
| 2003/0236794 A1 | 12/2003 | Hostetter et al. |
| 2004/0010752 A1 | 1/2004 | Chan et al. |
| 2004/0024724 A1 | 2/2004 | Rubin |
| 2004/0024790 A1 | 2/2004 | Everett |
| 2004/0044659 A1 | 3/2004 | Judd et al. |
| 2004/0054692 A1 | 3/2004 | Seyrat et al. |
| 2004/0060006 A1 | 3/2004 | Lindblad |
| 2004/0060007 A1 | 3/2004 | Gottlob et al. |
| 2004/0068498 A1 | 4/2004 | Patchet et al. |
| 2004/0103105 A1 | 5/2004 | Lindblad et al. |
| 2004/0122844 A1* | 6/2004 | Malloy ............ G06F 17/30592 |
| 2004/0205047 A1 | 10/2004 | Carpenter |
| 2004/0215642 A1 | 10/2004 | Cameron et al. |
| 2004/0239674 A1 | 12/2004 | Ewald et al. |
| 2004/0254909 A1 | 12/2004 | Testa |
| 2004/0260683 A1 | 12/2004 | Chan et al. |
| 2004/0260684 A1 | 12/2004 | Agrawal et al. |
| 2004/0268236 A1 | 12/2004 | Childlovskii et al. |
| 2005/0021548 A1 | 1/2005 | Bohannon et al. |
| 2005/0023524 A1 | 2/2005 | Beatty |
| 2005/0027495 A1 | 2/2005 | Matichuk |
| 2005/0027743 A1 | 2/2005 | O'Neil et al. |
| 2005/0028091 A1 | 2/2005 | Bordawekar |
| 2005/0050016 A1 | 3/2005 | Stanoi et al. |
| 2005/0050066 A1 | 3/2005 | Hughes |
| 2005/0058976 A1 | 3/2005 | Vernon |
| 2005/0060332 A1 | 3/2005 | Bernstein et al. |
| 2005/0065964 A1 | 3/2005 | Ziemann et al. |
| 2005/0097084 A1 | 5/2005 | Balmin |
| 2005/0125432 A1 | 6/2005 | Lin et al. |
| 2005/0138073 A1 | 6/2005 | Zhou et al. |
| 2005/0149471 A1 | 7/2005 | Lassalle |
| 2005/0154265 A1 | 7/2005 | Miro et al. |
| 2005/0154979 A1 | 7/2005 | Chidlovskii et al. |
| 2005/0156761 A1 | 7/2005 | Oh |
| 2005/0165732 A1 | 7/2005 | Burges |
| 2005/0171962 A1* | 8/2005 | Martin ............... H03M 7/30 |
| 2005/0187900 A1 | 8/2005 | LeTourneau |
| 2005/0214727 A1 | 9/2005 | Stoianovici et al. |
| 2005/0216445 A1 | 9/2005 | Rao |
| 2005/0267908 A1 | 12/2005 | LeTourneau |
| 2005/0286788 A1* | 12/2005 | Orr ............... H04L 25/03019 382/240 |
| 2006/0004817 A1* | 1/2006 | Andrews .......... G06F 17/30961 |
| 2006/0005122 A1 | 1/2006 | Lemoine |
| 2006/0015538 A1 | 1/2006 | LeTourneau |
| 2006/0053122 A1 | 3/2006 | Korn et al. |
| 2006/0074838 A1 | 4/2006 | Srivastava |
| 2006/0095442 A1 | 5/2006 | LeTourneau |
| 2006/0095455 A1 | 5/2006 | LeTourneau |
| 2006/0123029 A1 | 6/2006 | LeTourneau |
| 2006/0129582 A1 | 6/2006 | Schiffmann et al. |
| 2006/0209351 A1 | 9/2006 | Saito et al. |
| 2006/0259533 A1 | 11/2006 | LeTourneau |
| 2006/0271573 A1 | 11/2006 | LeTourneau |
| 2007/0003917 A1 | 1/2007 | Kitching et al. |
| 2007/0198538 A1 | 8/2007 | Palacios |
| 2008/0270435 A1 | 10/2008 | Furusho |
| 2008/0313196 A1 | 12/2008 | Furusho |
| 2010/0094885 A1 | 4/2010 | LeTourneau |
| 2010/0094908 A1 | 4/2010 | LeTourneau |
| 2010/0114969 A1 | 4/2010 | LeTourneau |
| 2010/0191775 A1 | 7/2010 | Schiffmann et al. |
| 2010/0205581 A1 | 8/2010 | LeTourneau |
| 2012/0144388 A1 | 6/2012 | Schiffmann |

OTHER PUBLICATIONS

U.S. Appl. No. 12/573,829 / Advisory Action/After Final Consideration Program Decision, dated Aug. 29, 2017, 5 pages.

U.S. Appl. No. 12/573,829 / RCE and Amendments, dated Sep. 5, 2017, 24 pages.

U.S. Appl. No. 15/250,118 / Amendment/Req. Reconsideration—After Non-Final Reject, dated Sep. 14, 2017, 44 pages.

U.S. Appl. No. 15/214,168 / Terminal Disclaimer, dated Jul. 17, 2017, 4 pages.

U.S. Appl. No. 15/214,168 / Notice of Allowance and Fees Due, dated Aug. 1, 2017, 26 pages.

U.S. Appl. No. 12/830,236 / Amendment/Req. Reconsideration—After Non-Final Reject, dated Oct. 23, 2017, 18 pages.

U.S. Appl. No. 14/641,735 / Letter Restarting Period for Response, Aug. 24, 2017, 22 pages.

U.S. Appl. No. 14/596,154 / Non-Final Rejection, dated Sep. 21, 2017, 19 pages.

U.S. Appl. No. 14/968,429 / Amendment/Req. Reconsideration—After Non-Final Reject, dated Aug. 9, 2017, 19 pages.

U.S. Appl. No. 14/968,429 / Final Rejection, dated Oct. 24, 2017, 10 pages.

Boppana et al., "Full Fault Dictionary Storage Based on Labeled Tree Encoding", Proceedings of $14^{th}$ VLSI Test Symposium, 1996, pp. 174-179.

(56) References Cited

OTHER PUBLICATIONS

U.S. Appl. No. 14/870,744 / Final Rejection, dated Mar. 30, 2018, 20 pages.
U.S. Appl. No. 12/573,829 / Amendment/Req. Reconsideration—After Non-Final Reject, dated Mar. 27, 2018, 22 pages.
U.S. Appl. No. 15/250,118 / RCE and Amendments, dated Apr. 16, 2018, 44 pages.
U.S. Appl. No. 15/802,348 / Notice of Publication, dated Apr. 19, 2018, 1 page.
U.S. Appl. No. 12/830,236 / Amendment/Req. Reconsideration—After Non-Final Reject, dated May 4, 2018, 26 pages.
U.S. Appl. No. 14/641,735 / Final Rejection, dated Mar. 15, 2018, 25 pages.
U.S. Appl. No. 14/641,735 / Response After Final Action, dated May 15, 2018, 28 pages.
U.S. Appl. No. 15/411,823 / Amendment/Req. Reconsideration—After Non-Final Rejection, dated Apr. 24, 2018, 18 pages.
U.S. Appl. No. 15/411,823 / Terminal Disclaimer—Filed and Approved, dated Apr. 24, 2018, 3 pages.
U.S. Appl. No. 14/968,429 / Terminal Disclaimer—Filed and Approved, dated Feb. 7, 2018, 3 pages.
U.S. Appl. No. 14/968,429 / Response After Final Action, dated Feb. 7, 2018, 13 pages.
U.S. Appl. No. 14/968,429 / Notice of Allowance and Fees Due, dated Feb. 26, 2018, 8 pages.
U.S. Appl. No. 14/968,429 / Notice of Allowance and Fees Due, dated Mar. 19, 2018, 6 pages.
"Core Technology Benchmarks A White Paper", Jul. 2002, downloaded from the internet Mar. 2, 2004.
"Origin Data, Inc. White Paper", © 1999, pp. 1-13.
"The Associative Model of Data White Paper", Lazy Software, Ltd., 2000.
ACM Portal Search Results (Kleene and prime and enumeration and operation and natural and numerals and sequences and "enumeration operation") conducted by Examiner on Jul. 18, 2009, 6 pages
ACM Portal Search Results (Kleene and prime and enumeration and operation and natural and numerals and sequences and enumeration and operation) conducted by Examiner on Jul. 18, 2009, 1 page.
Alderson et al., "Toward an Optimization Driven Framework for Designing and Generating Realistic Internet Topologies" ACM SIGCOMM Computer Communications Review 41, vol. 33, No. 1, pp. 41-46, 2003.
Apostol, "A Centennial History of the Prime Number Theorem", Engineering and Science, No. 4, 1996.
Benedikt et al., "Definable Relations and First-Order Query Languages over Strings" Journal of the ACM, vol. 50, No. 5, pp. 694-751, 2003.
Cano et al., "Lazy Evaluation in Penniless Propagation over Join Trees", Networks, vol. 39(4), 2002 Wiley Periodicals, Inc., 175-185, 2002.
Cole, Richard, Hariharan, Ramesh, and Indyk, Piotr. "Tree pattern matching and subset matching in deterministic O(n log 3 n)-time", Proceedings of the Tenth Annual ACM-SIAM Symposium on Discrete Algorithms, p. 1-10, Jan. 2, 1999, Baltimore, Maryland, United States.
Cooper et al., "Oh! Pascal!", 1982, W.W. Norton & Company, Inc., Chapter 12, Arrays for Random Access, pp. 295-327.
Coenen, Frans; Leng, Paul and Ahmed, Shakil; "T-Trees, Vertical Partitioning and Distributed Association Rule Mining", IEEE, 2003.
Dubiner, M., Galil, Z., and Magen, E. "Faster Tree Pattern Matching.", Journal of the Association for Computing Machinery, vol. 41, No. 2, Mar. 1994, pp. 205-213.
Durango Bill's Enumeration of Trees. http://web.archive.org/web/20021028184112/http://www.durangobill.com/Trees.html, 1998.
Er, M.C., "Enumerating Ordered Trees Lexicographically", The Computation Journal, vol. 28, Issue 5, pp. 538-542, 1985.
Google search (Kleene prime enumeration operation natural numerals sequences "Kleene prime") conducted by Examiner on Jul. 18, 2009, 2 pages.
Ferragina et al., "The String B-Tree: A New Data Structure for String Search in External Memory and Its Applications", Journal of the ACM, vol. 46, No. 2, pp. 236-280, 1999.
Google Search (Kleene prime enumeration operation natural numerals sequences "enumeration operation") conducted by Examiner on Jul. 18, 2009, 2 pages.
Google Search (Kleene prime enumeration operation) conducted by Examiner on Jul. 18, 2009, 2 pages.
Hoffman et al., "Pattern Matching in Trees", Purdue University, Jan. 1982, Journal for the Association for Computing Machinery, vol. 29, Issue 1, pp. 68-95.
Iacob et al., "XPath Extension for Querying Concurrent XML Markup", Technical Report #TR 394-04, Department of Computer Science, University of Kentucky, Lexington, KY 40506, Mar. 6, 2004, 15 pages.
IEEE Explore Digital Library Search Result conducted by Examiner on Jul. 18, 2009, 1 page.
Johnston et al. Advances in Dataflow Programming Languages, ACM Computing Surveys, vol. 36, No. 1, pp. 1-34, 2004.
Kharbutli et al., "Using Prime Numbers for Cache Indexing to Eliminate Conflict Misses", Dept. of Electrical and Computer Engineering, North Carolina State University, Feb. 2004, 24 pages.
Kilpelainen, "Tree Matching Problems with Applications to Structured Text Databases", Ph.D. Dissertation, Department of Computer Science, University of Helsinki, Report A-1992-6, Helsinki, Finland, pp. 1-109, Nov. 1992.
Knuth, "The Art of Computer Programming", vol. 1 Fundamental Algorithms, Second edition, Addison-Wesley Series in *Computer Science and Information Processing*, ISBN 0-201-03809-9, Reading, Massachusetts, Copyright 1973.
Leinonen et al., "Automation of Document Structure Transformations", Auditorium, Microteknia Building, University of Kuopio, Nov. 5, 2004, 68 pages.
Lerman et al., "Learning the Common Structure of Data", American Association for Artificial Intelligence, AAAI-00 Proceedings, www.aaai.org, Apr. 13, 2000, 6 pages.
Letourneau, "The Elementary Theory of Object Oriented Arithmetic", pp. 1-9, Apr. 1990.
Malhotra et al, "A Methodology for Formal Expression of Hierarchy in Model Solution", IEEE, pp. 258-267,1983.
Navarro, "A Guided Tour to Approximate String Matching", ACM Computing Surveys, vol. 33, No. 1, pp. 31-88, 2001.
Neven, Frank and Thomas Schwentick, "Expressive and efficient pattern languages for tree-structured data" Proceedings of the Nineteenth ACM SIGACT-SIGMOD-SIGART Symposium on Principles of Database Systems, May 2000.
Prasad et al., "Efficient Bit-Parallel Multi-Patterns String Matching Algorithms for Limited Expression", ACM, pp. 1-6, 2010.
Ramesh, R. and Ramakrishnan, I.V., "Nonlinear Pattern Matching in Trees." Journal of the Association for Computer Machinery, vol. 39, No. 2. Apr. 1992, pp. 295-316.
Reiss, "Semantics-Based Code Search", IEEE ICSE, pp. 243-253, 2009.
Schmidt et al., "Comparision of Tree and Graph Encodings as Function of Problem Complexity", ACM, pp. 1674-1679, 2007.
Sechrest et al., "Blending Hierarchical and Attribute-Based File Naming", Distributed Computing System, 1992, Proceedings of the 12th International Conference on Jun. 9-12, 1992, pp. 572-580.
Shanmugasundaram et al., "Querying SML Views of Relational Data", Proceedings of the 27th VLDB Conference, Roma, Italy, 2001, 9 pages.
Sinha et al, "Efficient Trie Based Sorting of Large Sets of Strings," ACM, pp. 1-8, 2003.
Sitaraman, Krishna, Ranganathan, N., and Ejnioui, Abdel, "A VLSI Architecture for Object Recognition using Tree Matching" Proceedings of the IEEE International Conference on Application-Specific Systems, Architectures, and Processors (ASAP'02) Dec. 2001, pp. 1-71.
Smorynski, Craig, "Logical No. Theory I: An Introduction", Springer-Verlag Berlin Heidelberg, © 1991, Arithmetic Encoding, The Cantor Pairing Function, pp, 14-23, and 305.
Somani et al., "Phased-Mission System Analysis Using Boolean Algebraic Methods", May 1994, ACM Press, vol. 22, Issue 1.

(56) References Cited

OTHER PUBLICATIONS

Spinells "Declarative Peephole Optimization Using String Pattern Matching", ACM, pp. 47-51, 1999.
Sproat et al., "Compilation of Weighted Finite-State Tranducers from Decision Trees" ACM, pp. 215-222, 1996.
Stanat, D.F., and McAllister, D.F., "Discrete Mathematics in Computer Science", Prentice-Hall, 1977, Binary Relations, Ch. 3, Sec. 3.2, Trees, p. 131-145.
Talukdar, "Learning to Create Data-Integrating Queries", ACM PVLDB, pp. 785-796, 2008.
Thiemann, "Grammar-Based Analysis of String Expressions", ACM, pp. 59-70, 2005.
Valiente, "Algorithms on Trees and Graphs", Tree Isomorphism, pp. 151-251, Springer 2002.
Valiente, Gabriel, "Tree Isomorphism," of Algorithms on Trees and Graphs, Chapter 4, published by Springer, 2002, 51 pages.
Wagner et al., "The String-to-String Correction Problem", Journal of the Association for Computing Machinery, vol. 21, No. 1, pp. 168-173, 1974.
Wu, "A Prime Number Labeling Scheme for Dynamic Ordered XML Trees", IEEE, 2004, 13 pages.
Xie et al., "S-Looper: Automatice Summarization for Multipath String Loops", ACM, pp. 188-198, 2015.
Yates et al, "A New Approach to Text Searchin", Communications of the ACM, vol. 35, No. 10, pp. 74-82, 1992.
Zaks, S., "Lexicographic Generation of Ordered Trees", Dept. of Computer Science, University of Illinois, The Journal of Theoretical Computer Science, vol. 10(1), pp. 63-82, Revised 1978.
U.S. Appl. No. 11/005,859 / Application filed Dec. 6, 2004, 120 pages.
U.S. Appl. No. 11/005,859 / Notice to File Missing parts dated Jan. 10, 2005, 2 pages.
U.S. Appl. No. 11/005,859 / Response to Notice to File Missing parts dated Apr. 1, 2005, 9 pages.
U.S. Appl. No. 11/005,859 / Preliminary Amendment filed Apr. 28, 2005, 193 pages.
U.S. Appl. No. 11/005,859 / Office Action—Restriction Requirement dated Dec. 12, 2007, 7 pages.
U.S. Appl. No. 11/005,859 / Response to Office Action—Restriction Requirement filed Jan. 14, 2008, 82 pages.
U.S. Appl. No. 11/005,859 / Non-final Office Action dated Mar. 21, 2008, 10 pages.
U.S. Appl. No. 11/005,859 / Amendment filed Jul. 21, 2008, 86 pages.
U.S. Appl. No. 11/005,859 / Final Office Action dated Oct. 30, 2008, 14 pages.
U.S. Appl. No. 11/005,859 / Amendment filed Dec. 30, 2008, 83 pages.
U.S. Appl. No. 11/005,859 / Advisory Action dated Jan. 13, 2009, 4 pages.
U.S. Appl. No. 11/005,859 / RCE with amendment filed Apr. 30, 2009, 86 pages.
U.S. Appl. No. 11/005,859 / Final Office Action dated Jul. 8, 2009, 9 pages.
U.S. Appl. No. 11/005,859 / Examiner Interview Summary, 3 pages.
U.S. Appl. No. 11/005,859 / Amendment filed Dec. 8, 2009, 83 pages.
U.S. Appl. No. 11/005,859 / Advisory Action dated Dec. 22, 2009, 3 pages.
U.S. Appl. No. 11/005,859 / RCE with Amendment filed Jan. 7, 2010, 85 pages.
U.S. Appl. No. 11/005,859 / Non-Final Office Action dated Jan. 21, 2010, 8 pages.
U.S. Appl. No. 11/005,859 / Response to Non-Final Office Action filed Feb. 25, 2010, 83 pages.
U.S. Appl. No. 11/005,859 / Final Office Action dated Jun. 8, 2010, 9 pages.
U.S. Appl. No. 11/005,859 / Office Action Response dated Sep. 1, 2010, 89 pages.
U.S. Appl. No. 11/005,859 / Advisory Action dated Sep. 14, 2010, 3 pages.
U.S. Appl. No. 11/005,859 / Notice of Appeal dated Sep. 29, 2010, 1 page.
U.S. Appl. No. 11/005,859 / Office Action dated Oct. 15, 2010, 5 pages.
U.S. Appl. No. 11/005,859 / Office Action Response dated Jan. 18, 2011, 95 pages.
U.S. Appl. No. 11/005,859 / Final Office Action dated Mar. 30, 2011, 7 pages.
U.S. Appl. No. 11/005,859 / Notice of Allowance and Fees Due, dated Jun. 9, 2011, 11 pages.
U.S. Appl. No. 11/005,859 / Amendment after Notice of Allowance and Issue Fee Payment, dated Sep. 9, 2011, 2 pages.
U.S. Appl. No. 11/005,859 / Issue Notification, dated Sep. 21, 2011, 1 page.
U.S. Appl. No. 13/229,624 / Application as filed on Sep. 9, 2011, 139 pages.
U.S. Appl. No. 13/229,624 / Filing receipt, dated Sep. 21, 2011, 4 pages.
U.S. Appl. No. 13/229,624 / Non-Final Office Action, dated Nov. 23, 2011, 8 pages.
U.S. Appl. No. 13/229,624 / Notice of Publication, dated Dec. 30, 2011, 1 page.
U.S. Appl. No. 13/229,624 / Amendment, dated Feb. 23, 2012, 22 pages.
U.S. Appl. No. 13/229,624 / Final Office Action, dated Mar. 20, 2012, 10 pages.
U.S. Appl. No. 13/229,624 / Amendment after final, dated Jun. 13, 2012, 25 pages.
U.S. Appl. No. 13/229,624 / Advisory Action, dated Jun. 20, 2012, 4 pages.
U.S. Appl. No. 13/229,624 / RCE, dated Jul. 20, 2012, 26 pages.
U.S. Appl. No. 13/229,624 / Non-Final Rejection, dated Oct. 2, 2013, 9 pages.
U.S. Appl. No. 13/229,624 / Response to non-final office action, dated Dec. 27, 2013, 11 pages.
U.S. Appl. No. 13/229,624 / Non-Final Office Action, dated Apr. 4, 2014, 5 Pages.
U.S. Appl. No. 13/229,624 / Non-Final Office Action Response, dated Aug. 1, 2014, 9 Pages.
U.S. Appl. No. 13/229,624 / Final Rejection. dated Oct. 30, 2014, 6 pages.
U.S. Appl. No. 13/229,624 / Response and Amendments after Final, filed Jan. 30, 2015, 11 pages.
U.S. Appl. No. 13/229,624 / Advisory Action, dated Mar. 11, 2015, 3 pages.
U.S. Appl. No. 13/229,624 / Applicant Initiated Interview Summary, dated Mar. 19, 2015, 3 pages.
U.S. Appl. No. 13/229,624 / Response After Final Action and Interview Summary, filed Mar. 27, 2015, 20 pages.
U.S. Appl. No. 13/229,624 / RCE and Amendments, filed Apr. 27, 2015, 17 pages.
U.S. Appl. No. 13/229,624 / Notice of Allowance and Fees, dated Jul. 6, 2015, 21 pages.
U.S. Appl. No. 13/229,624 / Issue Fee Payment, dated Sep. 28, 2015, 1 page.
U.S. Appl. No. 13/229,624 / Issue Notification, dated Oct. 14, 2015, 1 page.
U.S. Appl. No. 14/870,744 / Application as filed Sep. 30, 2015, 127 pages.
U.S. Appl. No. 14/870,744 / Preliminary Amendments, dated Oct. 6, 2015, 10 pages.
U.S. Appl. No. 14/870,744 / Notice to File Missing Parts, dated Oct. 16, 2015, 2 pages.
U.S. Appl. No. 14/870,744 / Filing Receipt, dated Oct. 16, 2015, 3 pages.
U.S. Appl. No. 14/870,744 / Applicant Response to Pre-Exam Formalities Notice, dated Feb. 19, 2016, 2 pages.
U.S. Appl. No. 14/870,744 / Filing Receipt, dated Mar. 2, 2016, 3 pages.
U.S. Appl. No. 14/870,744 / Notice of Publication, dated Jun. 9, 2016, 1 page.

(56) References Cited

OTHER PUBLICATIONS

U.S. Appl. No. 11/007,139 / Application filed Dec. 7, 2004, 90 pages.
U.S. Appl. No. 11/007,139 / Notice to File Missing Parts dated Jan. 19, 2005, 2 pages.
U.S. Appl. No. 11/007,139 / Response to Notice to File Missing Parts dated Apr. 1, 2005, 9 pages.
U.S. Appl. No. 11/007,139 / Preliminary Amendment filed Apr. 28, 2005, 146 pages.
U.S. Appl. No. 11/007,139 / Non-final Office Action dated May 14, 2007, 58 pages.
U.S. Appl. No. 11/007,139 / Amendment filed Oct. 15, 2007, 32 pages.
U.S. Appl. No. 11/007,139 / Supplemental Response filed Oct. 17, 2007, 7 pages.
U.S. Appl. No. 11/007,139 / Non-final Office Action dated Jan. 2, 2008 with Examiner's search results, 21 pages.
U.S. Appl. No. 11/007,139 / Amendment filed Apr. 2, 2008, 30 pages.
U.S. Appl. No. 11/007,139 / Final Office Action dated Aug. 15, 2008, 30 pages.
U.S. Appl. No. 11/007,139 / Amendment filed Oct. 15, 2008, 26 pages.
U.S. Appl. No. 11/007,139 / Advisory Action dated Oct. 22, 2008, 26 pages.
U.S. Appl. No. 11/007,139 / RCE with Amendment filed Nov. 14, 2008, 32 pages.
U.S. Appl. No. 11/007,139 / Non-final Office Action dated Dec. 8, 2008, 24 pages.
U.S. Appl. No. 11/007,139 / Amendment filed May 8, 2009, 31 pages.
U.S. Appl. No. 11/007,139 / Final Office Action dated Aug. 4, 2009, 26 pages.
U.S. Appl. No. 11/007,139 / Amendment filed Dec. 4, 2009, 28 pages.
U.S. Appl. No. 11/007,139 / Advisory Action dated Dec. 14, 2009, 4 pages.
U.S. Appl. No. 11/007,139 / RCE with amendment filed Jan. 4, 2010, 27 pages.
U.S. Appl. No. 11/007,139 / Non-Final Office Action dated Jan. 27, 2010, 31 pages.
U.S. Appl. No. 11/007,139 / Response to Non-Final Office Action filed Apr. 27, 2010, 30 pages.
U.S. Appl. No. 11/007,139 / Office Action dated Jul. 20, 2010, 20 pages.
U.S. Appl. No. 11/007,139 / Office Action response dated Oct. 20, 2010, 33 pages.
U.S. Appl. No. 11/007,139 / Advisory Action dated Oct. 25, 2010, 2 pages.
U.S. Appl. No. 11/007,139 / Office Action response dated Nov. 18, 2010, 24 pages.
U.S. Appl. No. 11/007,139 / Advisory Action dated Dec. 1, 2010, 4 pages.
U.S. Appl. No. 11/007,139 / Office Action response and Notice of Appeal dated Dec. 20, 2010, 29 pages.
U.S. Appl. No. 11/007,139 / Office Action dated Jan. 3, 2011, 24 pages.
U.S. Appl. No. 11/007,139 / Office Action response, dated May 3, 2011, 27 pages.
U.S. Appl. No. 11/007,139 / Final Office Action, dated Jul. 18, 2011, 23 pages.
U.S. Appl. No. 11/007,139 / Amendment after final dated Oct. 18, 2011, 30 pages.
U.S. Appl. No. 11/007,139 / Advisory Action and rule 312 amendment, dated Nov. 4, 2011, 4 pages.
U.S. Appl. No. 11/007,139 / Notice of Appeal filed Nov. 16, 2011, 1 page.
U.S. Appl. No. 11/007,139 / Appeal Brief filed May 1, 2012, 93 pages.
U.S. Appl. No. 11/007,139 / Notice of defective appeal brief, mailed May 7, 2012, 3 pages.
U.S. Appl. No. 11/007,139 / Appeal Brief filed May 15, 2012, 9 pages.
U.S. Appl. No. 11/007,139 / Examiner's answer to appeal brief, mailed Aug. 20, 2012, 35 pages.
U.S. Appl. No. 11/007,139 / Reply Brief, mailed Oct. 22, 2012, 29 pages.
U.S. Appl. No. 11/007,139 / Appeal Docketing Notice, mailed Nov. 6, 2012, 2 pages.
U.S. Appl. No. 11/007,139 / Patent Board Decision, mailed Jul. 24, 2015, 8 pages.
U.S. Appl. No. 11/007,139 / RCE, Sep. 18, 2015, 19 pages.
U.S. Appl. No. 11/007,139 / Non-Final Rejection, dated Dec. 31, 2015, 10 pages.
U.S. Appl. No. 11/007,139 / Amendment/Req. Reconsideration—After Non-Final Rejection, dated Mar. 28, 2016, 19 pages.
U.S. Appl. No. 11/007,139 / Final Rejection, dated Jun. 20, 2016, 12 pages.
U.S. Appl. No. 11/007,139 / Response After Final Action, dated Jul. 29, 2016, 17 pages.
U.S. Appl. No. 11/007,139 / Notice of Allowance and Fees, dated Aug. 23, 2016, 10 pages.
U.S. Appl. No. 11/007,139 / Filing Receipt, dated Sep. 2, 2016, 3 pages.
U.S. Appl. No. 11/007,139 / RCE, dated Nov. 10, 2016, 3 pages.
U.S. Appl. No. 11/007,139 / Notice of Allowance and Fees, dated Dec. 29, 2016, 8 pages.
U.S. Appl. No. 15/043,267 / Application as filed Feb. 12, 2016, 92 pages.
U.S. Appl. No. 15/043,267 / Preliminary Amendment, dated Feb. 12, 2016, 7 pages.
U.S. Appl. No. 15/043,267 / Filing Receipt, dated Mar. 7, 2016, 3 pages.
U.S. Appl. No. 15/043,267 / Preliminary Amendment, dated Jun. 10, 2016, 9 pages.
U.S. Appl. No. 15/043,267 / Filing Receipt, dated Oct. 25, 2016, 3 pages.
U.S. Appl. No. 15/043,267 / Notice of Publication, dated Feb. 2, 2017, 1 page.
U.S. Appl. No. 11/006,320 / Application filed Dec. 6, 2004, 75 pages.
U.S. Appl. No. 11/006,320 / Response to Missing Parts and Preliminary Amendment filed May 9, 2005, 135 pages.
U.S. Appl. No. 11/006,320 / Office Action—Restriction Requirement dated Mar. 26, 2007, 7 pages.
U.S. Appl. No. 11/006,320 / Response to Restriction Requirement filed Apr. 27, 2007, 34 pages.
U.S. Appl. No. 11/006,320 / Notice of Non-Compliant Amendment dated Jul. 6, 2007, 3 pages.
U.S. Appl. No. 11/006,320 / Response to Non-Compliant Amendment filed Jul. 25, 2007, 33 pages.
U.S. Appl. No. 11/006,320 / Non-final Office Action dated Oct. 1, 2007, 24 pages.
U.S. Appl. No. 11/006,320 / Amendment filed Jan. 29, 2008, 45 pages.
U.S. Appl. No. 11/006,320 / Notice of Non-Compliant Amendment dated Apr. 8, 2008, 4 pages.
U.S. Appl. No. 11/006,320 / Amendment filed May 5, 2008, 44 pages.
U.S. Appl. No. 11/006,320 / Non-final Office Action dated Aug. 15, 2008, 33 pages.
U.S. Appl. No. 11/006,320 / Amendment filed Nov. 14, 2008, 40 pages.
U.S. Appl. No. 11/006,320 / Office Action—Shortened Statutory Period dated Jan. 27, 2009, 2 pages.
U.S. Appl. No. 11/006,320 / Amendment filed Apr. 27, 2009, 44 pages.
U.S. Appl. No. 11/006,320 / Final Office Action dated Jul. 29, 2009, 13 pages.
U.S. Appl. No. 11/006,320 / Amendment filed Nov. 30, 2009, 10 pages.

(56) References Cited

OTHER PUBLICATIONS

U.S. Appl. No. 11/006,320 / Non-final Office Action dated Dec. 4, 2009, 25 pages.
U.S. Appl. No. 11/006,320 / Response to Non-Final Office Action filed Feb. 23, 2010, 11 pages.
U.S. Appl. No. 11/006,320 / Final Office Action dated May 24, 2010, 11 pages.
U.S. Appl. No. 11/006,320 / Office Action response dated Aug. 24, 2010, 15 pages.
U.S. Appl. No. 11/006,320 / Notice of Allowance dated Sep. 17, 2010, 8 pages.
U.S. Appl. No. 11/006,320 / Examiner Interview Summary and supplemental Notice of Allowance dated Dec. 17, 2010, 9 pages.
U.S. Appl. No. 11/006,320 / Rule 312 Amendment and Issue Fee payment dated Dec. 17, 2010, 10 pages.
U.S. Appl. No. 11/006,320 / Issue Notification dated Jan. 12, 2011, 1 page.
U.S. Appl. No. 12/972,326 / Application as filed on Dec. 17, 2010, 74 pages.
U.S. Appl. No. 12/972,326 / Filing receipt and Notice to File Missing Parts dated Jan. 6, 2011, 5 pages.
U.S. Appl. No. 12/972,326 / Response to Notice to File Missing parts dated Jan. 26, 2011, 14 pages.
U.S. Appl. No. 12/972,326 / Filing Receipt, dated Feb. 18, 2011, 3 pages.
U.S. Appl. No. 12/972,326 / Preliminary amendment dated May 20, 2011, 15 pages.
U.S. Appl. No. 12/972,326 / Notice of publication and non-compliant amendment dated Jun. 2, 2011, 3 pages.
U.S. Appl. No. 12/972,326 / Preliminary amendment dated Jul. 5, 2011, 21 pages.
U.S. Appl. No. 12/972,326 / Notice of additional fee due, dated Jul. 12, 2011, 2 pages.
U.S. Appl. No. 12/972,326 / Preliminary Amendment dated Aug. 10, 2011, 7 pages.
U.S. Appl. No. 12/972,326 / Non-Final Office Action, dated Feb. 23, 2012, 9 pages.
U.S. Appl. No. 12/972,326 / Abandonment, dated Sep. 18, 2012, 2 pages.
U.S. Appl. No. 13/014,677 / Application as filed on Jan. 26, 2011, 90 pages.
U.S. Appl. No. 13/014,677 / Notice to file missing parts and filing receipt, dated Mar. 23, 2011, 5 pages.
U.S. Appl. No. 13/014,677 / Notice of Abandonment dated Nov. 29, 2011, 2 pages.
U.S. Appl. No. 11/006,848 / Application as filed Dec. 7, 2004, 59 pages.
U.S. Appl. No. 11/006,848 / Notice to File Missing Parts dated Mar. 18, 2005, 2 pages.
U.S. Appl. No. 11/006,848 / Response to Notice to File Missing Parts dated May 3, 2005, 101 pages.
U.S. Appl. No. 11/006,848 / Non-Final Office Action dated Apr. 4, 2007, 11 pages.
U.S. Appl. No. 11/006,848 / Response to Non-Final Office Action dated Oct. 3, 2007, 20 pages.
U.S. Appl. No. 11/006,848 / Supplemental Amendment dated Nov. 13, 2007, 4 pages.
U.S. Appl. No. 11/006,848 / Non-Final Office Action dated Feb. 5, 2008, 16 pages.
U.S. Appl. No. 11/006,848 / Response to Non-Final Office Action filed Aug. 4, 2008, 27 pages.
U.S. Appl. No. 11/006,848 / Final Office Action dated Dec. 2, 2008, 30 pages.
U.S. Appl. No. 11/006,848 / RCE filed May 4, 2009, 24 pages.
U.S. Appl. No. 11/006,848 / Notice of Allowance dated Jun. 11, 2009, 8 pages.
U.S. Appl. No. 11/006,848 / Issue fee dated Sep. 11, 2009, 10 pages.
U.S. Appl. No. 11/006,848 / Issue Notification dated Oct. 28, 2009, 1 page.
U.S. Appl. No. 12/573,829 / Application as filed on Oct. 5, 2009, 64 pages.
U.S. Appl. No. 12/573,829 / Notice to File Missing Parts and Filing Receipt dated Oct. 20, 2009, 5 pages.
U.S. Appl. No. 12/573,829 / Preliminary Amendment dated Dec. 21, 2009, 17 pages.
U.S. Appl. No. 12/573,829 / Filing receipt dated Jan. 4, 2010, 5 pages.
U.S. Appl. No. 12/573,829 / Notice of Publication dated Apr. 15, 2010, 1 page.
U.S. Appl. No. 12/573,829 / Office Action dated Jun. 28, 2010, 35 pages.
U.S. Appl. No. 12/573,829 / Office Action Response dated Sep. 28, 2010, 22 pages.
U.S. Appl. No. 12/573,829 / Office Action dated Nov. 1, 2010, 29 pages.
U.S. Appl. No. 12/573,829 / Office Action Response dated Jan. 3, 2011, 29 pages.
U.S. Appl. No. 12/573,829 / Advisory Action dated Jan. 7, 2011, 3 pages.
U.S. Appl. No. 12/573,829 / Notice of Appeal dated Jan. 11, 2011, 1 page.
U.S. Appl. No. 12/573,829 / Appeal Brief, mailed May 4, 2011, 68 pages.
U.S. Appl. No. 12/573,829 / Examiner's Answer to Appeal Brief, mailed Jul. 21, 2011, 31 pages.
U.S. Appl. No. 12/573,829 / Reply brief filed Sep. 21, 2011, 17 pages.
U.S. Appl. No. 12/573,829 / Reply brief noted Oct. 5, 2011, 2 pages.
U.S. Appl. No. 12/573,829 / Appeal Docketing notice Oct. 11, 2011, 2 pages.
U.S. Appl. No. 12/573,829 / Appeal Board Decision, mailed May 9, 2014, 10 pages.
U.S. Appl. No. 12/573,829 / Request for continued examination, dated Jul. 9, 2014, 19 pages.
U.S. Appl. No. 12/573,829 / Non-Final Rejection and Examiner's Search, dated Apr. 28, 2015, 22 pages.
U.S. Appl. No. 12/573,829 / Amendment/Req. Reconsideration After Non-Final Rejection, filed Jul. 27, 2015, 21 pages.
U.S. Appl. No. 12/573,829 / Final Rejection and Examiner search, dated Sep. 15, 2015, 17 pages.
U.S. Appl. No. 12/573,829 / Response After Final Action, dated Nov. 16, 2015, 17 pages.
U.S. Appl. No. 12/573,829 / Advisory Action, dated Dec. 2, 2015, 4 pages.
U.S. Appl. No. 12/573,829 / Request for Continued Examination and Amendments, dated Dec. 14, 2015, 17 pages.
U.S. Appl. No. 12/573,829 / Non-Final Rejection, dated Jun. 13, 2016, 18 pages.
U.S. Appl. No. 12/573,829 / Amendment/Req. Reconsideration—After Non-Final Reject, dated Sep. 13, 2016, 24 pages.
U.S. Appl. No. 12/573,829 / Filing Receipt, dated Sep. 15, 2016, 3 pages.
U.S. Appl. No. 12/573,829 / Non-Final Rejection, dated Dec. 16, 2016, 10 pages.
U.S. Appl. No. 12/573,829 / Amendment/Req. Reconsideration—After Non-Final Reject, dated Mar. 16, 2017, 18 pages.
U.S. Appl. No. 11/006,841 / Application as filed on Dec. 7, 2004, 63 pages.
U.S. Appl. No. 11/006,841 / Notice to file missing parts dated Jan. 10, 2005, 2 pages.
U.S. Appl. No. 11/006,841 / Response to Notice to file missing parts and preliminary amendment dated Apr. 14, 2005, 105 pages.
U.S. Appl. No. 11/006,841 / Non-Final OA dated Apr. 6, 2007, 16 pages.
U.S. Appl. No. 11/006,841 / Response to Non-Final OA dated Sep. 6, 2007, 63 pages.
U.S. Appl. No. 11/006,841 / Restriction Requirement dated Nov. 27, 2007, 5 pages.
U.S. Appl. No. 11/006,841 / Restriction Requirement response dated Dec. 27, 2007, 36 pages.
U.S. Appl. No. 11/006,841 / Restriction Requirement dated Mar. 17, 2008, 9 pages.

(56) References Cited

OTHER PUBLICATIONS

U.S. Appl. No. 11/006,841 / Response to Restriction Requirement dated Jul. 17, 2008, 33 pages.
U.S. Appl. No. 11/006,841 / Final Office Action dated Oct. 29, 2008, 54 pages.
U.S. Appl. No. 11/006,841 / Response to Final Office Action dated Dec. 29, 2008, 45 pages.
U.S. Appl. No. 11/006,841 / Advisory Action dated Jan. 6, 2009, 3 pages.
U.S. Appl. No. 11/006,841 / RCE mailed Apr. 23, 2009, 48 pages.
U.S. Appl. No. 11/006,841 / Supplemental Response dated Jun. 26, 2009, 34 pages.
U.S. Appl. No. 11/006,841 / Notice of Allowance dated Jun. 29, 2009, 40 pages.
U.S. Appl. No. 11/006,841 / Issue Fee dated Sep. 29, 2009, 4 pages.
U.S. Appl. No. 11/006,841 / Issue Notification dated Nov. 11, 2009, 1 page.
U.S. Appl. No. 12/578,411 / Continuation application filed Oct. 13, 2009, 75 pages.
U.S. Appl. No. 12/578,411 / Notice of Missing Parts dated Oct. 28, 2009, 6 pages.
U.S. Appl. No. 12/578,411 / Response to Missing Parts filed Dec. 28, 2009, 25 pages.
U.S. Appl. No. 12/578,411 / Filing Receipt dated Jan. 7, 2010, 3 pages.
U.S. Appl. No. 12/578,411 / Notice of Publication dated Apr. 15, 2010, 1 page.
U.S. Appl. No. 12/578,411 / Restriction requirement dated Jun. 8, 2011, 6 pages.
U.S. Appl. No. 12/578,411 / Response to restriction requirement dated Jul. 6, 2011, 19 pages.
U.S. Appl. No. 12/578,411 / Non-Final Office Action, dated Aug. 23, 2011, 19 pages.
U.S. Appl. No. 12/578,411 / Non-Final Office Action response dated Dec. 22, 2011, 38 pages.
U.S. Appl. No. 12/578,411 / Final Rejection dated Jan. 20, 2012, 16 pages.
U.S. Appl. No. 12/578,411 / Amendment, dated May 21, 2012, 23 pages.
U.S. Appl. No. 12/578,411 / Advisory Action, dated May 31, 2012, 4 pages.
U.S. Appl. No. 12/578,411 / RCE, dated Jun. 12, 2012, 38 pages.
U.S. Appl. No. 12/578,411 / Notice of Allowance, dated Aug. 19, 2013, 19 pages.
U.S. Appl. No. 12/578,411 / Issue fee payment and Rule 312 amendment, dated Nov. 14, 2013, 14 pages.
U.S. Appl. No. 12/578,411 / Examiner response to rule 312 amendment, dated Nov. 19, 2013, 2 pages.
U.S. Appl. No. 12/578,411 / Response to Amendment under rule 312, dated Dec. 3, 2013, 3 pages.
U.S. Appl. No. 12/578,411 / Issue Notification, dated Dec. 18, 2013, 1 page.
U.S. Appl. No. 14/086,837 / Application as Filed on Nov. 21, 2013, 68 Pages.
U.S. Appl. No. 14/086,837 / Notice to File Missing Parts, dated Dec. 12, 2013, 5 Pages.
U.S. Appl. No. 14/086,837 / Applicant Response to Pre-Exam Formalities Notice, dated Jun. 11, 2014, 26 Pages.
U.S. Appl. No. 14/086,837 / Notice of Publication, dated Sep. 25, 2014, 4 Pages.
U.S. Appl. No. 14/086,837 / Terminal Disclaimer, Filed Nov. 14, 2014, 1 page.
U.S. Appl. No. 14/086,837 / Examiner's search strategy and results, dated Dec. 2, 2014, 9 pages.
U.S. Appl. No. 14/086,837 / Notice of Allowance and Fees, dated Dec. 2, 2014, 17 pages.
U.S. Appl. No. 14/086,837 / Amendment After Notice of Allowance, filed Feb. 27, 2015, 9 pages.
U.S. Appl. No. 14/086,837 / Issue Fee Payment, filed Feb. 27, 2015, 1 page.
U.S. Appl. No. 14/086,837 / Issue Notification, dated May 6, 2015, 1 page.
U.S. Appl. No. 14/635,836 / Application as filed on Mar. 2, 2015, 70 pages.
U.S. Appl. No. 14/635,836 / Filing Receipt, dated Mar. 12, 2015, 3 pages.
U.S. Appl. No. 14/635,836 / Notice to File Missing Parts, dated Mar. 12, 2015, 2 pages.
U.S. Appl. No. 14/635,836 / Applicant Response to Pre-Exam Formalities Notice, filed May 12, 2015, 40 pages.
U.S. Appl. No. 14/635,836 / Filing receipt, dated May 19, 2015, 3 pages.
U.S. Appl. No. 14/635,836 / Notice of Publication, dated Aug. 27, 2015, 1 page.
U.S. Appl. No. 14/635,836 / Electronic Terminal Disclaimer Approved and Filed, Nov. 13, 2015, 3 pages.
U.S. Appl. No. 14/635,836 / Notice of Allowance and Fees Due, dated Apr. 18, 2016, 25 pages.
U.S. Appl. No. 14/635,836 / Issue Fee Payment and Amendment after NOA, dated Jul. 15, 2016, 15 pages.
U.S. Appl. No. 14/635,836 / Response to Amendment under Rule 312, dated Jul. 21, 2016, 1 page.
U.S. Appl. No. 14/635,836 / Response to Amendment under Rule 312, dated Jul. 22, 2016, 2 page.
U.S. Appl. No. 14/635,836 / Issue Notification, dated Aug. 10, 2016, 1 page.
U.S. Appl. No. 15/250,118 / Application as filed Aug. 29, 2016, 71 pages.
U.S. Appl. No. 15/250,118 / Preliminary Amendment, dated Aug. 29, 2016, 20 pages.
U.S. Appl. No. 15/250,118 / Filing Receipt, dated Sep. 9, 2016, 3 pages.
U.S. Appl. No. 15/250,118 / Applicant Response to Pre-Exam Formalities Notice, dated Nov. 8, 2016, 21 pages.
U.S. Appl. No. 15/250,118 / Filing Receipt, dated Nov. 15, 2016, 3 pages.
U.S. Appl. No. 15/250,118 / Notice of Publication, dated Feb. 23, 2017, 1 page.
U.S. Appl. No. 11/006,440 / Application as filed on Dec. 6, 2004, 85 pages.
U.S. Appl. No. 11/006,440 / Notice to file missing parts dated Jan. 11, 2005, 2 pages.
U.S. Appl. No. 11/006,440 / Response to Notice to file missing parts dated Mar. 15, 2005, 8 pages.
U.S. Appl. No. 11/006,440 / Preliminary Amendment dated Apr. 28, 2005, 140 pages.
U.S. Appl. No. 11/006,440 / Preliminary Amendment and Substitute Specification dated Oct. 10, 2006, 139 pages.
U.S. Appl. No. 11/006,440 / Restriction Requirement dated Mar. 29, 2007, 5 pages.
U.S. Appl. No. 11/006,440 / Response to Restriction Requirement dated Apr. 30, 2007, 42 pages.
U.S. Appl. No. 11/006,440 / Non-Final Office Action dated Jun. 21, 2007, 15 pages.
U.S. Appl. No. 11/006,440 / Response to Non-Final Office Action dated Nov. 20, 2007, 42 pages.
U.S. Appl. No. 11/006,440 / Final Office Action dated Feb. 6, 2008, 13 pages.
U.S. Appl. No. 11/006,440 / Response to Final Office Action dated Apr. 7, 2008, 34 pages.
U.S. Appl. No. 11/006,440 / Advisory Action dated May 9, 2008, 3 pages.
U.S. Appl. No. 11/006,440 / Notice of appeal dated Aug. 4, 2008, 1 page.
U.S. Appl. No. 11/006,440 / RCE dated Nov. 4, 2008, 39 pages.
U.S. Appl. No. 11/006,440 / Final Office Action dated Jan. 23, 2009, 22 pages.
U.S. Appl. No. 11/006,440 / Amendment after Final dated Apr. 23, 2009, 34 pages.
U.S. Appl. No. 11/006,440 / Supplemental Amendment dated Jul. 17, 2009, 29 pages.
U.S. Appl. No. 11/006,440 / Notice of Allowance dated Jul. 31, 2009, 15 pages.

(56) References Cited

OTHER PUBLICATIONS

U.S. Appl. No. 11/006,440 / Examiner's Amendment and Reasons for Allowance dated Sep. 3, 2009, 9 pages.
U.S. Appl. No. 11/006,440 / Issue Fee dated Nov. 2, 2009, 12 pages.
U.S. Appl. No. 11/006,440 / Issue Notification dated Dec. 2, 2009, 1 page.
U.S. Appl. No. 12/627,816 / Continuation application filed Nov. 30, 2009, 95 pages.
U.S. Appl. No. 12/627,816 / Notice of Missing Parts dated Dec. 15, 2009, 2 pages.
U.S. Appl. No. 12/627,816 / Response to Missing Parts filed Apr. 12, 2010, 21 pages.
U.S. Appl. No. 12/627,816 / Filing Receipt dated Apr. 20, 2010, 3 pages.
U.S. Appl. No. 12/627,816 / Notice of Publication dated Jul. 29, 2010, 1 page.
U.S. Appl. No. 12/627,816 / Non-Final OA, dated May 5, 2011, 19 pages.
U.S. Appl. No. 12/627,816 / Non-Final OA response, dated Nov. 7, 2011, 12 pages.
U.S. Appl. No. 12/627,816 / Final Rejection dated Nov. 17, 2011, 18 pages.
U.S. Appl. No. 12/627,816 / RCE dated Feb. 17, 2012, 20 pages.
U.S. Appl. No. 12/627,816 / Terminal disclaimer review, dated Mar. 7, 2012, 1 page.
U.S. Appl. No. 12/627,816 / Notice of Allowance, dated Aug. 1, 2013, 16 pages.
U.S. Appl. No. 12/627,816 / Issue fee payment and Rule 312 amendment, dated Nov. 1, 2013, 14 pages.
U.S. Appl. No. 12/627,816 / Examiner response to rule 312 amendment, dated Nov. 13, 2013, 2 pages.
U.S. Appl. No. 12/627,816 / Issue Notification, dated Nov. 26, 2013, 1 page.
U.S. Appl. No. 14/086,808 / Application as Filed on Nov. 21, 2013, 87 Pages.
U.S. Appl. No. 14/086,808 / Notice to File Missing Parts and Filing Receipt, dated Dec. 11, 2013, 5 Pages.
U.S. Appl. No. 14/086,808 / Applicant Response to Pre-Exam Formalities Notice, dated Jun. 11, 2014, 53 Pages.
U.S. Appl. No. 14/086,808 / Filing receipt, dated Jun. 17, 2014, 3 Pages.
U.S. Appl. No. 14/086,808 / Notice of Publication, dated Sep. 25, 2014, 1 Page.
U.S. Appl. No. 14/086,808 / Terminal Disclaimer, Filed Oct. 24, 2014, 2 pages.
U.S. Appl. No. 14/086,808 / Terminal Disclaimer Review Decision, dated Oct. 29, 2014, 1 page.
U.S. Appl. No. 14/086,808 / Terminal Disclaimer, Filed Nov. 4, 2014, 2 pages.
U.S. Appl. No. 14/086,808 / Terminal Disclaimer Review Decision, dated Nov. 13, 2014, 1 page.
U.S. Appl. No. 14/086,808 / Examiner's search strategy and results, dated Nov. 17, 2014, 5 pages.
U.S. Appl. No. 14/086,808 / Notice of Allowance and fees, dated Nov. 17, 2014, 16 pages.
U.S. Appl. No. 14/086,808 / Issue Fee Payment and Rule 312 amendment, filed Feb. 17, 2015, 1 page.
U.S. Appl. No. 14/086,808 / Amendment After Notice of Allowance, dated Feb. 17, 2015, 17 pages.
U.S. Appl. No. 14/086,808 / Response to Amendment under Rule 312, dated Feb. 20, 2015, 2 pages.
U.S. Appl. No. 14/086,808 / Response to Amendment under Rule 312, dated Feb. 25, 2015, 3 pages.
U.S. Appl. No. 14/086,808 / Issue Notification, dated Mar. 18, 2015, 1 page.
U.S. Appl. No. 14/625,473 / Application as filed on Feb. 18, 2015, 92 pages.
U.S. Appl. No. 14/625,473 / Filing Receipt, dated Mar. 18, 2015, 3 pages.
U.S. Appl. No. 14/625,473 / Notice to File Missing Parts, dated Mar. 18, 2015.
U.S. Appl. No. 14/625,473 / Response to Pre-Exam Formalities Notice and Preliminary Amendment, filed May 18, 2015, 28 pages.
U.S. Appl. No. 14/625,473 / Filing Receipt, dated May 20, 2015, 3 pages.
U.S. Appl. No. 14/625,473 / Notice of Publication, dated Aug. 27, 2015, 1 page.
U.S. Appl. No. 14/625,473 / Electronic Terminal Disclaimer Filed and Approved, Nov. 13, 2015, 3 pages.
U.S. Appl. No. 14/625,473 / Notice of Allowance, dated Mar. 28, 2016, 19 pages.
U.S. Appl. No. 14/625,473 / Issue Fee Payment and Amendments after Notice of Allowance, dated Jun. 28, 2016, 24 pages.
U.S. Appl. No. 14/625,473 / Response to Amendment under Rule 312, dated Jun. 30, 2016, 1 page.
U.S. Appl. No. 14/625,473 / Issue Notification, dated Jul. 20, 2016, 1 page.
U.S. Appl. No. 15/214,168 / Application as filed with preliminary amendments, dated Jul. 19, 2016, 116 pages.
U.S. Appl. No. 15/214,168 / Filing Receipt, dated Aug. 3, 2016, 4 pages.
U.S. Appl. No. 15/214,168 / Corrected Filing Receipt, dated Oct. 12, 2016, 4 pages.
U.S. Appl. No. 15/214,168 / Notice of Publication, dated Nov. 10, 2016, 1 page.
U.S. Appl. No. 15/214,168 / Non-Final Rejection, dated Mar. 2, 2017, 20 pages.
U.S. Appl. No. 11/006,446 / Application filed Dec. 6, 2004, 91 pages.
U.S. Appl. No. 11/006,446 / Notice of Missing Parts dated Jan. 24, 2005, 3 pages.
U.S. Appl. No. 11/006,446 / Response to Notice to File Missing Parts dated Mar. 29, 2005, 8 pages.
U.S. Appl. No. 11/006,446 / Preliminary Amendment filed Apr. 28, 2005, 118 pages.
U.S. Appl. No. 11/006,446 / Office Action—Restriction Requirement dated Apr. 4, 2007, 5 pages.
U.S. Appl. No. 11/006,446 / Response to Office Action—Restriction Requirement filed May 3, 2007, 6 pages.
U.S. Appl. No. 11/006,446 / Non-final Office Action dated Jul. 26, 2007, 45 pages.
U.S. Appl. No. 11/006,446 / Amendment filed Nov. 26, 2007, 38 pages.
U.S. Appl. No. 11/006,446 / Non-final Office Action dated Feb. 20, 2008, 67 pages.
U.S. Appl. No. 11/006,446 / Amendment filed Jul. 21, 2008, 33 pages.
U.S. Appl. No. 11/006,446 / Final Office Action dated Oct. 28, 2008, 49 pages.
U.S. Appl. No. 11/006,446 / Amendment filed Dec. 29, 2008, 33 pages.
U.S. Appl. No. 11/006,446 / Advisory Action dated Jan. 7, 2009, 4 pages.
U.S. Appl. No. 11/006,446 / RCE with Amendment filed Apr. 28, 2009, 38 pages.
U.S. Appl. No. 11/006,446 / Non-final Office Action dated Jul. 7, 2009, 41 pages.
U.S. Appl. No. 11/006,446 / Examiner Interview Summary and Search Results dated Oct. 26, 2009, 6 pages.
U.S. Appl. No. 11/006,446 / Amendment dated Dec. 7, 2009, 33 pages.
U.S. Appl. No. 11/006,446 / Examiner Interview Summary dated Mar. 19, 2010, 4 pages.
U.S. Appl. No. 11/006,446 / Notice of Allowance/Allowability dated Mar. 19, 2010, 29 pages.
U.S. Appl. No. 11/006,446 / Issue Fee Payment and 312 Amendment filed Jun. 21, 2010, 23 pages.
U.S. Appl. No. 11/006,446 / Rule 312 Amendment dated Aug. 19, 2010, 2 pages.
U.S. Appl. No. 11/006,446 / Formal drawings dated Aug. 25, 2010, 29 pages.

(56) References Cited

OTHER PUBLICATIONS

U.S. Appl. No. 11/006,446 / Issue Notification dated Sep. 1, 2010, 1 page.
U.S. Appl. No. 12/830,236 / Divisional Application filed Jul. 2, 2010, 103 pages.
U.S. Appl. No. 12/830,236 / Notice to File Corrected Application Papers dated Jul. 16, 2010, 5 pages.
U.S. Appl. No. 12/830,236 / Response to Notice to File Corrected Application Papers dated Aug. 25, 2010, 32 pages.
U.S. Appl. No. 12/830,236 / Filing receipt dated Sep. 3, 2010, 3 pages.
U.S. Appl. No. 12/830,236 / Notice of Publication dated Dec. 16, 2010, 1 page.
U.S. Appl. No. 12/830,236 / Restriction requirement dated Mar. 18, 2011, 6 pages.
U.S. Appl. No. 12/830,236 / Restriction requirement response, dated Apr. 18, 2011, 5 pages.
U.S. Appl. No. 12/830,236 / Non-Final Office Action, dated May 11, 2011, 10 pages.
U.S. Appl. No. 12/830,236 / Response to Non-Final Office Action dated Jul. 6, 2011, 18 pages.
U.S. Appl. No. 12/830,236 / Final Office Action, dated Oct. 14, 2011, 18 pages.
U.S. Appl. No. 12/830,236 / Amendment after final, filed Jan. 17, 2012, 26 pages.
U.S. Appl. No. 12/830,236 / Advisory Action, dated Feb. 8, 2012, 6 pages.
U.S. Appl. No. 12/830,236 / Notice of Appeal filed Mar. 8, 2012, 3 pages.
U.S. Appl. No. 12/830,236 / RCE, filed Jun. 5, 2012, 23 pages.
U.S. Appl. No. 12/830,236 / Non-Final Office Action, dated Jul. 31, 2012, 18 pages.
U.S. Appl. No. 12/830,236 / Amendment, filed Nov. 1, 2012, 27 pages.
U.S. Appl. No. 12/830,236 / Final Office Action, dated Feb. 27, 2013, 35 pages.
U.S. Appl. No. 12/830,236 / Response after final, dated Jun. 27, 2013, 36 pages.
U.S. Appl. No. 12/830,236 / Advisory action, dated Jul. 12, 2013, 4 pages.
U.S. Appl. No. 12/830,236 / Notice of appeal, filed Jul. 19, 2013, 2 pages.
U.S. Appl. No. 12/830,236 / Appeal brief, filed Sep. 18, 2013, 44 pages.
U.S. Appl. No. 12/830,236 / Examiners answer to appeal brief, dated Dec. 18, 2013, 35 pages.
U.S. Appl. No. 12/830,236 / Reply Brief as Filed on Feb. 18, 2014, 16 Pages.
U.S. Appl. No. 12/830,236 / Appeal Docketing Notice, Mar. 21, 2014, 2 Pages.
U.S. Appl. No. 12/830,236 / Patent Board Decision, Mar. 9, 2016, 6 pages.
U.S. Appl. No. 12/830,236 / RCE and Amendments, dated Apr. 27, 2016, 15 pages.
U.S. Appl. No. 12/830,236 / Non-Final Rejection and Examiner Search, dated Jun. 29, 2016, 75 pages.
U.S. Appl. No. 12/830,236 / Amendment/Req. Reconsideration—After Non-Final Reject, dated Sep. 6, 2016, 12 pages.
U.S. Appl. No. 12/830,236 / Final Rejection, dated Dec. 14, 2016, 22 pages.
U.S. Appl. No. 12/830,236 / Response After Final Action, dated Feb. 13, 2017, 14 pages.
U.S. Appl. No. 12/830,236 / Advisory Action, dated Mar. 3, 2017, 2 pages.
U.S. Appl. No. 11/385,257 / Application filed Mar. 20, 2006, 118 pages.
U.S. Appl. No. 11/385,257 / Notice of Missing Parts dated May 3, 2006, 2 pages.
U.S. Appl. No. 11/385,257 / Response to Missing Parts filed Aug. 3, 2006, 46 pages.
U.S. Appl. No. 11/385,257 / Notice of Publication dated Nov. 30, 2006, 1 page.
U.S. Appl. No. 11/385,257 / Non-final Office Action dated Apr. 29, 2008, 44 pages.
U.S. Appl. No. 11/385,257 / Amendment filed Jul. 29, 2008, 29 pages.
U.S. Appl. No. 11/385,257 / Final Office Action dated Dec. 9, 2008, 47 pages.
U.S. Appl. No. 11/385,257 / RCE with Amendment filed May 11, 2009, 38 pages.
U.S. Appl. No. 11/385,257 / Supplemental Amendment filed May 26, 2009, 32 pages.
U.S. Appl. No. 11/385,257 / Notice of Non-Compliant Amendment dated Jun. 1, 2009, 3 pages.
U.S. Appl. No. 11/385,257 / Amendment filed Jun. 30, 2009, 34 pages.
U.S. Appl. No. 11/385,257 / Non-final Office Action dated Sep. 14, 2009, 60 pages.
U.S. Appl. No. 11/385,257 / Response to Non-Final Office Action filed Jan. 13, 2010, 34 pages.
U.S. Appl. No. 11/385,257 / Final Office Action dated Apr. 12, 2010, 47 pages.
U.S. Appl. No. 11/385,257 / RCE dated Aug. 12, 2010, 35 pages.
U.S. Appl. No. 11/385,257 / Office Action dated Sep. 30, 2010, 39 pages.
U.S. Appl. No. 11/385,257 / Office Action response, dated Mar. 29, 2011, 31 pages.
U.S. Appl. No. 11/385,257 / Final Rejection dated Jun. 1, 2011, 40 pages.
U.S. Appl. No. 11/385,257 / Request for continued Examination dated Nov. 1, 2011, 30 pages.
U.S. Appl. No. 11/385,257 / Non-Final Office Action, dated Jan. 9, 2012, 40 pages.
U.S. Appl. No. 11/385,257 / Amendment, dated Apr. 6, 2012, 30 pages.
U.S. Appl. No. 11/385,257 / Notice of allowance and Examiner interview summary, dated Jun. 22, 2012, 36 pages.
U.S. Appl. No. 11/385,257 / Office communication concerning previous IDS filing, dated Oct. 4, 2012, 4 pages.
U.S. Appl. No. 11/385,257 / Miscellaneous Communication to Applicant, dated Oct. 15, 2012, 3 pages.
U.S. Appl. No. 11/385,257 / Rule 312 Amendment, dated Dec. 12, 2012, 10 pages.
U.S. Appl. No. 11/385,257 / Issue Notification, dated Dec. 22, 2012, 1 page.
U.S. Appl. No. 11/625,812 / Application as filed on Sep. 24, 2012, 123 pages.
U.S. Appl. No. 11/625,812 / Notice to file missing parts, dated Oct. 15, 2012, 6 pages.
U.S. Appl. No. 11/625,812 / Response to Notice to file missing parts and preliminary amendment, dated Mar. 8, 2013, 47 pages.
U.S. Appl. No. 11/625,812 / Notice of incomplete reply, dated Mar. 15, 2013, 3 pages.
U.S. Appl. No. 13/625,812 / Response to incomplete reply notice, dated Apr. 2, 2013, 5 pages.
U.S. Appl. No. 13/625,812 / Non-Final office action, dated Jul. 26, 2013, 29 pages.
U.S. Appl. No. 13/625,812 / Publication notice, dated Aug. 1, 2013, 1 page.
U.S. Appl. No. 13/625,812 / Response to non-final office action, dated Oct. 9, 2013, 15 pages.
U.S. Appl. No. 13/625,812 / Final rejection, dated Dec. 3, 2013, 28 pages.
U.S. Appl. No. 13/625,812 / Response After Final Action, dated Apr. 1, 2014, 1 Page.
U.S. Appl. No. 13/625,812 / Advisory Action (PTOL-303), dated Apr. 9, 2014, 3 Pages.
U.S. Appl. No. 13/625,812 / Notice of Appeal, filed May 5, 2014, 1 Page.
U.S. Appl. No. 13/625,812 / Request for Continued Examination, dated Aug. 4, 2014, 18 Pages.
U.S. Appl. No. 13/625,812 / Request for Corrected Filing Receipt, dated Aug. 21, 2014, 6 Pages.

(56) References Cited

OTHER PUBLICATIONS

U.S. Appl. No. 13/625,812 / Filing Receipt, dated Aug. 27, 2014, 3 Pages.
U.S. Appl. No. 13/625,812 / Notice of Allowance and Fees, dated Dec. 9, 2014, 20 pages.
U.S. Appl. No. 13/625,812 / Filing Receipt, dated Feb. 2, 2015, 3 pages.
U.S. Appl. No. 13/625,812 / Filing Receipt, dated Feb. 6, 2015, 3 pages.
U.S. Appl. No. 13/625,812 / Terminal Disclaimer Filed Mar. 2, 2015, 1 page.
U.S. Appl. No. 13/625,812 / Post Allowance Arguments/Amendments, filed Mar. 6, 2015, 6 pages.
U.S. Appl. No. 13/625,812 / Amendment After Notice of Allowance, filed Mar. 9, 2015, 3 pages.
U.S. Appl. No. 13/625,812 / Issue Fee Payment, filed Mar. 9, 2015, 1 page.
U.S. Appl. No. 13/625,812 / Terminal Disclaimer Review Decision, dated Mar. 12, 2015.
U.S. Appl. No. 14/641,735 / Application as filed on Mar. 9, 2015, 126 pages.
U.S. Appl. No. 14/641,735 / Filing Receipt, dated Mar. 20, 2015, 3 pages.
U.S. Appl. No. 14/641,735 / Notice to File Missing Parts, dated Mar. 20, 2015, 2 pages.
U.S. Appl. No. 14/641,735 / Notice of Incomplete Reply, dated Jun. 26, 2015, 2 pages.
U.S. Appl. No. 14/641,735 / Applicant Response to Pre-Exam Formalities Notice and Amendments, filed Jul. 8, 2015, 32 pages.
U.S. Appl. No. 14/641,735 / Electronic Terminal Disclaimer, filed Aug. 27, 2015, 3 pages.
U.S. Appl. No. 14/641,735 / Notice of Publication, dated Oct. 29, 2015, 1 page.
U.S. Appl. No. 14/641,735 / Preliminary Amendment, Jan. 14, 2016, 8 pages.
U.S. Appl. No. 11/319,758 / Application filed Dec. 27, 2005, 79 pages.
U.S. Appl. No. 11/319,758 / Notice of Missing Parts dated Feb. 1, 2006, 2 pages.
U.S. Appl. No. 11/319,758 / Response to Missing Parts filed Jul. 3, 2006, 15 pages.
U.S. Appl. No. 11/319,758 / Non-final Office Action dated Nov. 12, 2008, 46 pages.
U.S. Appl. No. 11/319,758 / Amendment filed May 12, 2009, 40 pages.
U.S. Appl. No. 11/319,758 / Final Office Action dated Aug. 3, 2009, 39 pages.
U.S. Appl. No. 11/319,758 / RCE filed Jan. 4, 2010, 45 pages.
U.S. Appl. No. 11/319,758 / Non-Final Office Action dated Mar. 30, 2010, 39 pages.
U.S. Appl. No. 11/319,758 / Office Action response dated Jul. 29, 2010, 30 pages.
U.S. Appl. No. 11/319,758 / Final Office Action dated Oct. 28, 2010, 31 pages.
U.S. Appl. No. 11/319,758 / Request for Continued Examination, dated Mar. 28, 2011, 32 pages.
U.S. Appl. No. 11/319,758 / Non-Final office action dated Jun. 3, 2011, 31 pages.
U.S. Appl. No. 11/319,758 / Non-Final Office Action Response dated Nov. 3, 2011, 29 pages.
U.S. Appl. No. 11/319,758 / Final Office Action, dated Jan. 17, 2012, 22 pages.
U.S. Appl. No. 11/319,758 / Amendment after final, dated May 17, 2012, 34 pages.
U.S. Appl. No. 11/319,758 / Advisory Action, dated Jun. 20, 2012, 3 pages.
U.S. Appl. No. 11/319,758 / Amendment after final, dated Jun. 28, 2012, 29 pages.
U.S. Appl. No. 11/319,758 / Notice of Allowance and examiner's interview summary, dated Jul. 17, 2012, 10 pages.
U.S. Appl. No. 11/319,758 / Issue Fee payment, Rule 312 and Miscellaneous Communication, dated Oct. 12, 2012, 12 pages.
U.S. Appl. No. 11/319,758 / Issue Notification, dated Oct. 31, 2012, 1 page.
U.S. Appl. No. 13/632,581 / Application as Filed on Oct. 1, 2012, 88 Pages.
U.S. Appl. No. 13/632,581 / Notice to File Missing Parts and Filing Receipt, dated Oct. 22, 2012, 27 Pages.
U.S. Appl. No. 13/632,581 / Filing Receipt, dated May 5, 2004, 3 Pages.
U.S. Appl. No. 13/632,581 / Notice of Publication, dated Jun. 13, 2013, 1 Page.
U.S. Appl. No. 13/632,581 / Non-final Office Action, dated Jul. 3, 2013, 22 Pages.
U.S. Appl. No. 13/632,581 / Non-Final Office Action Response, dated Sep. 11, 2013, 23 Pages.
U.S. Appl. No. 13/632,581 / Final Office Action, dated 121813, 27 Pages.
U.S. Appl. No. 13/632,581 / Response After Final Action, dated Mar. 18, 2014, 37 Pages.
U.S. Appl. No. 13/632,581 / Advisory Action (PTOL-303), dated Apr. 3, 2014, 4 Pages.
U.S. Appl. No. 13/632,581 / Notice of Appeal Filed Jul. 17, 2014, 2 Pages.
U.S. Appl. No. 13/632,581 / Request for Continued Examination, dated Jul. 16, 2014, 23 Pages.
U.S. Appl. No. 13/632,581 / Notice Non-Compliant Amendment, dated Oct. 20, 2014, 5 pages.
U.S. Appl. No. 13/632,581 / Amendment/Req Reconsideration after Non-Final Reject, Filed Nov. 4, 2014, 16 pages.
U.S. Appl. No. 13/632,581 / Non-Final Rejection, dated Jan. 27, 2015, 16 pages.
U.S. Appl. No. 13/632,581 / Amendment/Req Reconsideration Non-Final Rejection and Amendments, filed Apr. 20, 2015, 24 pages.
U.S. Appl. No. 13/632,581 / Final Rejection, dated Jul. 20, 2015, 21 pages.
U.S. Appl. No. 13/632,581 / After Final Consideration Request and Response, Sep. 21, 2015, 28 pages.
U.S. Appl. No. 13/632,581 / Advisory Action and After Final Decision, dated Oct. 2, 2015, 18 pages.
U.S. Appl. No. 13/632,581 / RCE and Amendments, dated Nov. 30, 2015, 55 pages.
U.S. Appl. No. 13/632,581 / Notice of Allowance and Fees, dated Dec. 17, 2015, 5 pages.
U.S. Appl. No. 13/632,581 / Filing Receipt, dated Jan. 22, 2016, 4 pages.
U.S. Appl. No. 13/632,581 / Electronic Terminal Disclaimer, Mar. 7, 2016, 3 pages.
U.S. Appl. No. 13/632,581 / Issue Fee Payment, Mar. 16, 2016, 1 page.
U.S. Appl. No. 13/632,581 / Amendment after Notice of Allowance, dated Mar. 16, 2016, 19 pages.
U.S. Appl. No. 13/632,581 / Response to Amendment under Rule 312, dated Mar. 22, 2016, 2 pages.
U.S. Appl. No. 13/632,581 / Issue Notification, dated Apr. 13, 2016, 1 page.
U.S. Appl. No. 15/081,612 / Application as Filed on Mar. 25, 2016, 87 Pages.
U.S. Appl. No. 15/081,612 / Notice to File Missing Parts and Filing Receipt, dated Apr. 11, 2016, 4 Pages.
U.S. Appl. No. 15/081,612 / Filing Receipt, Apr. 11, 2016, 3 Pages.
U.S. Appl. No. 15/081,612 / Applicant Response to Pre-Exam Formalities Notice and Preliminary Amendments, dated Jun. 13, 2016, 34 pages.
U.S. Appl. No. 15/081,612 / Preliminary Amendment, dated Jun. 14, 2016, 4 pages.
U.S. Appl. No. 15/081,612 / Filing Receipt, Jun. 21, 2016, 3 pages.
U.S. Appl. No. 15/081,612 / Non-Final Rejection, dated Jul. 27, 2016, 9 pages.
U.S. Appl. No. 15/081,612 / Electronic Terminal Disclaimer, Sep. 23, 2016, 3 pages.

(56) References Cited

OTHER PUBLICATIONS

U.S. Appl. No. 15/081,612 / Notice of Publication, dated Sep. 29, 2016, 1 page.
U.S. Appl. No. 15/081,612 / Amendment/Req. Reconsideration—After Non-Final Reject, dated Oct. 17, 2016, 10 pages.
U.S. Appl. No. 15/081,612 / Notice of Allowance and Fees, dated Oct. 27, 2016, 5 pages.
U.S. Appl. No. 15/081,612 / RCE, dated Jan. 30, 2017, 2 pages.
U.S. Appl. No. 15/081,612 / Issue Fee Payment, Jan. 30, 2017, 1 page.
U.S. Appl. No. 15/081,612 / Notice of Allowance and Fees Due, dated Jan. 30, 2017, 2 pages.
U.S. Appl. No. 15/081,612 / Notice of Allowance and Fees Due, dated Feb. 13, 2017, 7 pages.
U.S. Appl. No. 15/081,612 / Amendment After Notice of Allowance, dated Mar. 20, 2017, 4 pages.
U.S. Appl. No. 15/081,612 / Issue Fee Payment, Mar. 20, 2017, 1 page.
U.S. Appl. No. 11/006,842 / Application as filed on Dec. 7, 2004, 58 pages.
U.S. Appl. No. 11/006,842 / Notice to file missing parts dated Jan. 10, 2005, 2 pages.
U.S. Appl. No. 11/006,842 / Response to Notice to file missing parts dated Apr. 1, 2005, 7 pages.
U.S. Appl. No. 11/006,842 / Preliminary Amendment dated May 2, 2005, 93 pages.
U.S. Appl. No. 11/006,842 / Restriction Requirement dated Jan. 23, 2008, 5 pages.
U.S. Appl. No. 11/006,842 / Response to Restriction Requirement dated Feb. 25, 2008, 25 pages.
U.S. Appl. No. 11/006,842 / Restriction Requirement dated May 13, 2008, 5 pages.
U.S. Appl. No. 11/006,842 / Response to Restriction Requirement dated Aug. 13, 2008, 24 pages.
U.S. Appl. No. 11/006,842 / Non-Final Office Action dated Nov. 3, 2008.
U.S. Appl. No. 11/006,842 / Response to Non-Final Office Action dated May 4, 2009, 35 pages.
U.S. Appl. No. 11/006,842 / Supplemental Response dated Jul. 17, 2009, 23 pages.
U.S. Appl. No. 11/006,842 / Notice of Allowance dated Jul. 27, 2009, 13 pages.
U.S. Appl. No. 11/006,842 / Issue Fee filed Oct. 27, 2009, 1 page.
U.S. Appl. No. 11/006,842 / Issue notification dated Nov. 18, 2009, 1 page.
U.S. Appl. No. 12/613,450 / Continuation application filed Nov. 5, 2009, 63 pages.
U.S. Appl. No. 12/613,450 / Notice of Missing Parts dated Nov. 18, 2009, 2 pages.
U.S. Appl. No. 12/613,450 / Preliminary Amendment and Response to Missing Parts filed Jan. 19, 2010, 16 pages.
U.S. Appl. No. 12/613,450 / Filing receipt dated Jan. 27, 2010, 3 pages.
U.S. Appl. No. 12/613,450 / Notice of Publication dated May 6, 2010, 1 page.
U.S. Appl. No. 12/613,450 / Restriction requirement dated Jun. 10, 2011, 5 pages.
U.S. Appl. No. 12/613,450 / Response to restriction requirement dated Jul. 6, 2011, 17 pages.
U.S. Appl. No. 12/613,450 / Non-Final Office Action, dated Aug. 25, 2011, 15 pages.
U.S. Appl. No. 12/613,450 / Non-Final OA response dated Dec. 27, 2011, 28 pages.
U.S. Appl. No. 12/613,450 / Final rejection, dated Feb. 14, 2012, 14 pages.
U.S. Appl. No. 12/613,450 / Amendment after final, dated Jun. 8, 2012, 23 pages.
U.S. Appl. No. 12/613,450 / Advisory Action, dated Jun. 20, 2012, 4 pages.
U.S. Appl. No. 12/613,450 / RCE, dated Jul. 12, 2012, 25 pages.
U.S. Appl. No. 12/613,450 / Notice of Allowance, dated Oct. 7, 2013, 20 pages.
U.S. Appl. No. 12/613,450 / Electronic Terminal Disclaimer filed and approved, Jan. 2, 2014, 2 pages.
U.S. Appl. No. 12/613,450 / Amendment After Final or Under 37CFR 1.312, initialed by the Examiner, dated Jan. 14, 2014, 2 Pages.
U.S. Appl. No. 12/613,450 / Issue Notification, dated Jan. 22, 2014, 1 Page.
U.S. Appl. No. 14/149,749 / Application as Filed on Jan. 7, 2014, 59 Pages.
U.S. Appl. No. 14/149,749 / Notice to File Missing Parts and Filing Receipt, dated Jan. 23, 2014, 6 Pages.
U.S. Appl. No. 14/149,749 / Applicant Response to Pre-exam Formalities Notice, dated May 23, 2014 12 Pages.
U.S. Appl. No. 14/149,749 / Applicant Response to Pre-Exam Formalities Notice, dated Aug. 25, 2014, 103 Pages.
U.S. Appl. No. 14/149,749 / Filing Receipt, Mailed Sep. 4, 2014, 3 Pages.
U.S. Appl. No. 14/149,749 / Notice of Publication, dated Dec. 11, 2014, 1 page.
U.S. Appl. No. 14/149,749 / Electronic Terminal Disclaimer Filed and Approved Feb. 23, 2015.
U.S. Appl. No. 14/149,749 / Examiner Initiated Interview Summary, dated Feb. 24, 2015, 2 pages.
U.S. Appl. No. 14/149,749 / Notice of Allowance and Fees and Examiner Search, dated Apr. 17, 2015, 30 pages.
U.S. Appl. No. 14/149,749 / Amendment after Notice of Allowance, filed May 27, 2015, 10 pages.
U.S. Appl. No. 14/149,749 / Issue Fee Payment, filed May 27, 2015, 1 page.
U.S. Appl. No. 14/149,749 / Electronic Terminal Disclaimer Filed and Approved, May 27, 2015, 3 pages.
U.S. Appl. No. 14/149,749 / Response to Amendment under Rule 312, dated May 29, 2015, 1 page.
U.S. Appl. No. 14/149,749 / Response to Amendment under Rule 312, dated Jun. 1, 2015, 3 pages.
U.S. Appl. No. 14/149,749 / Issue Notification, dated Jun. 17, 2015, 1 page.
U.S. Appl. No. 14/726,192 / Application as Filed May 29, 2015, 39 pages.
U.S. Appl. No. 14/726,192 / Filing receipt, mailed Jun. 9, 2015, 3 pages.
U.S. Appl. No. 14/726,192 / Notice to File Missing Parts, dated Jun. 9, 2015, 2 pages.
U.S. Appl. No. 14/726,192 / Applicant Response to Pre-Exam Formalities Notice and Amendments, filed Aug. 12, 2015, 114 pages.
U.S. Appl. No. 14/726,192 / Filing Receipt, mailed Aug. 20, 2015, 3 pages.
U.S. Appl. No. 14/726,192 / Electronic Terminal Disclaimer Filed and Approved, Nov. 20, 2015, 3 pages.
U.S. Appl. No. 14/726,192 / Notice of Publication, dated Nov. 27, 2015, 1 page.
U.S. Appl. No. 14/726,192 / Issue Fee Payment and Amendment after Notice of Allowance, dated Jul. 18, 2016, 13 pages.
U.S. Appl. No. 14/726,192 / Response to Amendment under Rule 312, dated Jul. 21, 2016, 1 page.
U.S. Appl. No. 14/726,192 / Response to Amendment under Rule 312, dated Jul. 22, 2016, 2 pages.
U.S. Appl. No. 14/726,192 / Issue Notification, dated Aug. 3, 2016, 1 page.
U.S. Appl. No. 11/320,538 / Application filed Dec. 27, 2005, 76 pages.
U.S. Appl. No. 11/320,538 / Notice of Missing Parts dated Feb. 2, 2006, 2 pages.
U.S. Appl. No. 11/320,538 / Response to Missing Parts filed Aug. 2, 2006, 36 pages.
U.S. Appl. No. 11/320,538 / Non-final Office Action dated Apr. 1, 2009, 27 pages.
U.S. Appl. No. 11/320,538 / Amendment filed Jul. 1, 2009, 54 pages.

(56) References Cited

OTHER PUBLICATIONS

U.S. Appl. No. 11/320,538 / Final Office Action dated Nov. 2, 2009, 29 pages.
U.S. Appl. No. 11/320,538 / Response to Final Office Action filed Jan. 4, 2010, 23 pages.
U.S. Appl. No. 11/320,538 / Advisory Action dated Jan. 19, 2010, 3 pages.
U.S. Appl. No. 11/320,538 / RCE and Amendment filed Apr. 2, 2010, 26 pages.
U.S. Appl. No. 11/320,538 / Non-Final Office Action dated Jun. 9, 2010, 24 pages.
U.S. Appl. No. 11/320,538 / Office action dated Dec. 22, 2010, 10 pages.
U.S. Appl. No. 11/320,538 / Notice of Appeal, mailed May 23, 2011, 6 pages.
U.S. Appl. No. 11/320,538 / Pre-brief appeal conference decision mailed Jun. 30, 2011, 2 pages.
U.S. Appl. No. 11/320,538 / Request for Continued Examination dated Dec. 23, 2011, 21 pages.
U.S. Appl. No. 11/320,538 / Non-Final Office Action, dated Dec. 19, 2012, 12 pages.
U.S. Appl. No. 11/320,538 / Response to Non-final office action, dated Apr. 17, 2013, 20 pages.
U.S. Appl. No. 11/320,538 / Notice of allowance, dated Aug. 1, 2013, 25 pages.
U.S. Appl. No. 11/320,538 / Issue fee payment, mailed Nov. 1, 2013, 7 pages.
U.S. Appl. No. 11/320,538 / Rule 312 amendment, dated Nov. 19, 2013, 20 pages.
U.S. Appl. No. 11/320,538 / Issue Notification, mailed Dec. 4, 2013, 1 page.
U.S. Appl. No. 14/086,741 / Application as Filed on Dec. 12, 2013, 77 Pages.
U.S. Appl. No. 14/086,741 / Filing Receipt and Notice to File Missing Parts, dated Dec. 12, 2013, 6 Pages.
U.S. Appl. No. 14/086,741 / Applicant Response to Pre-Exam Formalities Notice, dated Jun. 12, 2014, 60 Pages.
U.S. Appl. No. 14/086,741 / Filing Receipt, Mailed Jun. 17, 2014, 3 Pages.
U.S. Appl. No. 14/086,741 / Notice of Publication, dated Sep. 25, 2014, 1 Page.
U.S. Appl. No. 14/086,741 / Terminal Disclaimer as Filed on Sep. 29, 2014, 1 Page.
U.S. Appl. No. 14/086,741 / Terminal Disclaimer Review Decision, dated Sep. 30, 2014, 1 Page.
U.S. Appl. No. 14/086,741 / Notice of Allowance and Fees and Examiner Summary, dated Oct. 3, 2014, 21 pages.
U.S. Appl. No. 14/086,741 / Notice of Allowance and Fees Due, Filed Oct. 3, 2014, 22 pages.
U.S. Appl. No. 14/086,741 / Amendment after Notice of Allowance, filed Jan. 5, 2015, 14 pages.
U.S. Appl. No. 14/086,741 / Issue Fee Payment, filed Jan. 5, 2015, 1 page.
U.S. Appl. No. 14/086,741 / Response to Amendment under Rule 312, dated Jan. 22, 2015, 2 pages.
U.S. Appl. No. 14/086,741 / Notice of Allowance and Fees and Examiner Search strategy, dated Mar. 16, 2015, 40 pages.
U.S. Appl. No. 14/086,741 / Issue Notification, Apr. 1, 2015, 1 page.
U.S. Appl. No. 14/596,154 / Application as filed Jan. 13, 2015, 60 pages.
U.S. Appl. No. 14/596,154 / Filing Receipt, mailed Jan. 27, 2015, 3 pages.
U.S. Appl. No. 14/596,154 / Notice to File Missing Parts, dated Jan. 27, 2015, 3 pages.
U.S. Appl. No. 14/596,154 / Applicant Response to Pre Exam Formalities Notice with Preliminary Amendments, filed Mar. 27, 2015, 85 pages.
U.S. Appl. No. 14/596,154 / Filing Receipt, mailed Apr. 2, 2015, 3 pages.
U.S. Appl. No. 14/596,154 / Notice of Publication, mailed Jul. 9, 2015, 1 page.
U.S. Appl. No. 14/596,154 / Electronic Terminal Disclaimer Filed and Approved, Nov. 20, 2015, 3 pages.
U.S. Appl. No. 11/361,500 / Application as filed on Feb. 23, 2006, 72 pages.
U.S. Appl. No. 11/361,500 / Notice to file missing parts mailed Mar. 23, 2006, 2 pages.
U.S. Appl. No. 11/361,500 / Response to Notice to File Missing Parts mailed Jul. 19, 2006, 27 pages.
U.S. Appl. No. 11/361,500 / Notice of Publication mailed Nov. 16, 2006, 1 page.
U.S. Appl. No. 11/361,500 / Office Action dated May 27, 2009, 18 pages.
U.S. Appl. No. 11/361,500 / Response to Office Action dated Aug. 27, 2009, 34 pages.
U.S. Appl. No. 11/361,500 / Notice of Allowance dated Dec. Dec. 11, 2009, 8 pages.
U.S. Appl. No. 11/361,500 / Issue Fee Payment and Rule 312 Amendment dated Jan. 6, 2010, 28 pages.
U.S. Appl. No. 11/361,500 / Response to Rule 312 Amendment dated Jan. 25, 2010, 4 pages.
U.S. Appl. No. 11/361,500 / Issue Notification mailed Feb. 24, 2010, 1 page.
U.S. Appl. No. 12/702,243 / Continuation Application with Preliminary Amendment filed Feb. 8, 2010, 83 pages.
U.S. Appl. No. 12/702,243 / Notice of Missing Parts dated Feb. 25, 2010, 2 pages.
U.S. Appl. No. 12/702,243 / Response to Missing Parts filed Apr. 26, 2010, 8 pages.
U.S. Appl. No. 12/702,243 / Filing receipt mailed May 4, 2010, 3 pages.
U.S. Appl. No. 12/702,243 / Notice of Publication dated Aug. 12, 2010, 1 page.
U.S. Appl. No. 12/702,243 / Non-Final rejection, dated Aug. 30, 2012, 8 pages.
U.S. Appl. No. 12/702,243 / Amendment, dated Nov. 20, 2012, 14 pages.
U.S. Appl. No. 12/702,243 / Terminal Disclaimer, mailed Jan. 2, 2013, 5 pages.
U.S. Appl. No. 12/702,243 / Terminal Disclaimer decision, mailed Jan. 14, 2013, 1 page1.
U.S. Appl. No. 12/702,243 / Notice of allowance and fees due and examiner interview summary, dated Jan. 10, 2013, pages.
U.S. Appl. No. 12/702,243 / Issue notification, mailed Apr. 24, 2013, 1 page.
U.S. Appl. No. 13/860,482 / Application as Filed on Apr. 10, 2013, 98 Pages.
U.S. Appl. No. 13/860,482 / Notice to File Missing Parts and Filing Receipt, dated May 21, 2013, 5 Pages.
U.S. Appl. No. 13/860,482 / Applicant Response to Pre-Exam Formalities Notice, dated Oct. 22, 2013, 3 Pages.
U.S. Appl. No. 13/860,482 / U.S. Appl. No. Notice of Publication, dated Feb. 6, 2014, 1 Page.
U.S. Appl. No. 13/860,482 / Non-Final Office Action, dated Jun. 9, 2014, 11 Pages.
U.S. Appl. No. 13/860,482 / Non-Final Office Action Response, dated Sep. 8, 2014, 19 Pages.
U.S. Appl. No. 13/860,482 / Terminal Disclaimer Review Decision, Sep. 9, 2014, 1 page.
U.S. Appl. No. 13/860,482 / Terminal Disclaimer Filed, Oct. 8, 2014, 1 page.
U.S. Appl. No. 13/860,482 / Terminal Disclaimer Review Decision, Oct. 9, 2014, 1 page.
U.S. Appl. No. 13/860,482 / Notice of Allowance and Fees Due, dated Nov. 5, 2014, 8 Pages.
U.S. Appl. No. 13/860,482 / Issue Fee Payment and Rule 312 Amendments, filed Feb. 4, 2015, 4 pages.
U.S. Appl. No. 13/860,482 / Issue Notification, mailed Mar. 4, 2015, 1 page.
U.S. Appl. No. 14/614,292 / Application as filed on Feb. 4, 2015, 76 pages.

(56) References Cited

OTHER PUBLICATIONS

14/614,292 / Attorney Ref. No. 151.P012C3: Notice to File Missing Parts and Filing Receipt, mailed Feb. 20, 2015, 5 pages.
U.S. Appl. No. 14/614,292 / Applicant Response to Pre-Exam Formalities Notice and Amendments, filed Apr. 17, 2015, 30 pages.
U.S. Appl. No. 14/614,292 / Filing Receipt, mailed Apr. 24, 2015, 3 pages.
U.S. Appl. No. 14/614,292 / Notice of Publication, mailed Aug. 6, 2015, 1 page.
U.S. Appl. No. 14/614,292 / Electronic Terminal Disclaimer Filed and Approved, Nov. 20, 2015, 3 pages.
U.S. Appl. No. 14/614,292 / Non-Final Rejection, dated May 19, 2016, 10 pages.
U.S. Appl. No. 14/614,292 / Amendment/Req. Reconsideration—After Non-Final Rejection, dated Aug. 18, 2016, 20 pages.
U.S. Appl. No. 14/614,292 / Notice of Allowance and Fees, dated Sep. 21, 2016, 8 pages.
U.S. Appl. No. 14/614,292 / Issue Fee Payment and Amendment after Notice of Allowance, dated Dec. 21, 2016, 4 pages.
U.S. Appl. No. 15/411,823 / Application as filed, Jan. 20, 2017, 77 pages.
U.S. Appl. No. 15/411,823 / Preliminary Amendment, dated Jan. 20, 2017, 25 pages.
U.S. Appl. No. 15/411,823 / Filing Receipt, Jan. 31, 2017, 3 pages.
U.S. Appl. No. 11/412,417 / Application filed Apr. 26, 2006, 96 pages.
U.S. Appl. No. 11/412,417 / Notice of Missing Parts dated May 19, 2006, 2 pages.
U.S. Appl. No. 11/412,417 / Response to Notice of Missing Parts filed Jul. 19, 2006, 14 pages.
U.S. Appl. No. 11/412,417 / Non-final Office Action dated Apr. 1, 2008, 53 pages.
U.S. Appl. No. 11/412,417 / Amendment filed Aug. 1, 2008, 34 pages.
U.S. Appl. No. 11/412,417 / Final Office Action dated Nov. 13, 2008, 40 pages.
U.S. Appl. No. 11/412,417 / RCE and Amendment filed May 12, 2009, 36 pages.
U.S. Appl. No. 11/412,417 / Non-final Office Action dated Jun. 30, 2009, 141 pages.
U.S. Appl. No. 11/412,417 / Examiner Interview Summary dated Oct. 30, 2009, 3 pages.
U.S. Appl. No. 11/412,417 / Amendment filed Oct. 30, 2009, 33 pages.
U.S. Appl. No. 11/412,417 / Final Office Action dated Jan. 4, 2010, 37 pages.
U.S. Appl. No. 11/412,417 / RCE with Amendment filed May 4, 2010, 27 pages.
U.S. Appl. No. 11/412,417 / Supplemental Office Action Response dated Jun. 22, 2010, 22 pages.
U.S. Appl. No. 11/412,417 / Notice of Allowance and bibliographic data sheet dated Jul. 6, 2010, 9 pages.
U.S. Appl. No. 11/412,417 / RCE dated Oct. 5, 2010, 4 pages.
U.S. Appl. No. 11/412,417 / Notice of Allowance and bibliographic data sheet dated Oct. 26, 2010, 4 pages.
U.S. Appl. No. 11/412,417 / Issue Fee Payment and Comments on Reasons for Allowance dated Jan. 26, 2011, 6 pages.
U.S. Appl. No. 11/412,417 / Issue Notification dated Feb. 9, 2011, 1 page.
U.S. Appl. No. 13/030,084 / Application filed Feb. 17, 2011, 103 pages.
U.S. Appl. No. 13/030,084 / Filing receipt and Notice to File Missing parts mailed Mar. 3, 2011, 6 pages.
U.S. Appl. No. 13/030,084 / Response to Notice to File Missing Parts, mailed Aug. 3, 2011, 23 pages.
U.S. Appl. No. 13/030,084 / Updated filing receipt, mailed Aug. 11, 2011, 3 pages.
U.S. Appl. No. 13/030,084 / Non-Final Rejection dated Oct. 26, 2011, 34 pages.
U.S. Appl. No. 13/030,084 / Notice of Publication mailed Nov. 17, 2011, 1 page.
U.S. Appl. No. 13/030,084 / Amendment, dated Jan. 26, 2012, 35 pages.
U.S. Appl. No. 13/030,084 / Notice regarding non-compliant amendment, dated Jan. 31, 2012, 4 pages.
U.S. Appl. No. 13/030,084 / Amendment, dated Feb. 9, 2012, 35 pages.
U.S. Appl. No. 13/030,084 / Final Rejection, dated Mar. 28, 2012, 62 pages.
U.S. Appl. No. 13/030,084 / Amendment after final, dated Jun. 14, 2012, 88 pages.
U.S. Appl. No. 13/030,084 / Advisory Action, dated Jun. 26, 2012, 4 pages.
U.S. Appl. No. 13/030,084 / RCE, dated Jul. 23, 2012, 89 pages.
U.S. Appl. No. 13/030,084 / Notice regarding non-compliant amendment, dated Jul. 25, 2012, 2 pages.
U.S. Appl. No. 13/030,084 / Amendment, dated Jan. 2, 2013, 40 pages.
U.S. Appl. No. 13/030,084 / Refund request, mailed Jan. 23, 2013, 17 pages.
U.S. Appl. No. 13/030,084 / Non-Final office action, dated Apr. 30, 2013, 39 pages.
U.S. Appl. No. 13/030,084 / Response to non-final office action, dated Jul. 30, 2013, 28 pages.
U.S. Appl. No. 13/030,084 / Non-final office action, dated Oct. 10, 2013, 44 pages.
U.S. Appl. No. 13/030,084 / Response after Non-Final Reject, dated Jan. 2, 2014, 1 Page.
U.S. Appl. No. 13/030,084 / Final Rejection, dated Mar. 19, 2014, 41 Pages.
U.S. Appl. No. 13/030,084 / Amendment Submitted/Entered with Filing of CPA/RCE, dated May 19, 2014, 38 Pages.
U.S. Appl. No. 13/030,084 / Advisory Action (PTOL-303), dated Jun. 6, 2014, 4 Pages.
U.S. Appl. No. 13/030,084 / Applicant Initiated Interview Summary (PTOL-413), dated Jul. 1, 2014, 3 Pages.
U.S. Appl. No. 13/030,084 / Request for Continued Examination, dated Aug. 15, 2014, 26 Pages.
U.S. Appl. No. 13/030,084 / Non-Final Rejection and Examiner's Search, dated Mar. 24, 2015, 24 pages.
U.S. Appl. No. 13/030,084 / Amendment/Req. Reconsideration After Non-Final Rejection, filed Jun. 24, 2015, 28 pages.
U.S. Appl. No. 13/030,084 / Terminal Disclaimer filed and Approved, Sep. 10, 2015, 3 pages.
U.S. Appl. No. 13/030,084 / Notice of Allowance and Fees, dated Sep. 17, 2015, 24 pages.
U.S. Appl. No. 13/030,084 / Issue Fee Payment and Amendment, dated Dec. 10, 2015, 4 pages.
U.S. Appl. No. 14/968,429 / Application as filed Dec. 14, 2015.
U.S. Appl. No. 14/968,429 / Filing Receipt, Jan. 4, 2016, 3 pages.
U.S. Appl. No. 14/968,429 / Applicant Response to Pre-Exam Formalities Notice, Jan. 14, 2016, 35 pages.
U.S. Appl. No. 14/968,429 / Filing Receipt, Jan. 21, 2016, 3 pages.
U.S. Appl. No. 14/968,429 / Notice of Publication, dated Apr. 28, 2016, 1 page.
U.S. Appl. No. 11/480,094 / Application filed Jun. 29, 2006, 125 pages.
U.S. Appl. No. 11/480,094 / Notice to File Corrected Application Papers dated Aug. 2, 2006, 2 pages.
U.S. Appl. No. 11/480,094 / Response to Notice to File Corrected Application Papers filed Nov. 2, 2006, 32 pages.
U.S. Appl. No. 11/480,094 / Filing Receipt mailed Dec. 7, 2006, 3 pages.
U.S. Appl. No. 11/480,094 / Non-final Office Action dated Nov. 7, 2008, 28 pages.
U.S. Appl. No. 11/480,094 / Amendment filed May 7, 2009, 37 pages.
U.S. Appl. No. 11/480,094 / Final Office Action dated Jul. 28, 2009, 16 pages.
U.S. Appl. No. 11/480,094 / RCE with Amendment filed Dec. 28, 2009, 39 pages.

(56) References Cited

OTHER PUBLICATIONS

U.S. Appl. No. 11/480,094 / Office Action dated Dec. 15, 2010, 15 pages.
U.S. Appl. No. 11/480,094 / Office Action response, dated May 16, 2011, 29 pages.
U.S. Appl. No. 11/480,094 / Final Office Action, dated Aug. 1, 2011, 13 pages.
U.S. Appl. No. 11/480,094 / Amendment after final dated Nov. 1, 2011, 32 pages.
U.S. Appl. No. 11/480,094 / Advisory Action dated Nov. 14, 2011, 3 pages.
U.S. Appl. No. 11/480,094 / Notice of Appeal mailed Nov. 28, 2011, 1 page.
U.S. Appl. No. 11/480,094 / Abandonment, mailed Jul. 31, 2012, 2 pages.
Borodin et al., "A Tradeoff Between Search and Update Time for the Implicit Dictionary Problem", Theoretical Computer Science vol. 1 No. 4 (1990), 425-447.
Caviness et al, "Simplification of Radical Expressions", ACM, pp. 329-338, 1976.
Hirschberg, "Algorithm for Computing Maximal Common Sebsequences", Communicatoin of the ACM, vol. 18, No. 6, pp. 341-343, 1975.
Katajainen et al., "Tree Compression and Optimization with Applications", International Journal of Foundations of Computer Science, vol. 1 No. 4 (1990), 425-447.
Siegel, "All Searches Are Divided into Three Parts String Searches Using Ternary Trees", ACM, pp. 57-68, 1988.
U.S. Appl. No. 14/870,744 / Amendment/Req. Reconsideration—After Non-Final Reject, dated Nov. 24, 2017, 30 pages.
U.S. Appl. No. 12/573,829 / Non-Final Rejection, dated Dec. 27, 2017, 13 pages.
U.S. Appl. No. 15/250,118 / Final Rejection, dated Dec. 15, 2017, 25 pages.
U.S. Appl. No. 15/802,348 / Application as filed with Preliminary Amendment, dated Nov. 2, 2017, 126 pages.
U.S. Appl. No. 15/214,168 / Amendment after Notice of Allowance, dated Nov. 1, 2017, 22 pages.
U.S. Appl. No. 15/214,168 / Issue Notification, dated Nov. 21, 2017, 1 page.
U.S. Appl. No. 15/802,348 / Filing Receipt, Nov. 30, 2017, 4 pages.
U.S. Appl. No. 15/802,348 / Notice to File Corrected Application Papers, dated Nov. 30, 2017, 2 pages.
U.S. Appl. No. 14/641,735 / Amendment/Req. Reconsideration—After Non-Final Reject, dated Nov. 24, 2017, 28 pages.
U.S. Appl. No. 12/830,236 / Non-Final Rejection, dated Feb. 6, 2018, 28 pages.
U.S. Appl. No. 14/596,154 / Amendment/Req. Reconsideration—After Non-Final Reject, dated Dec. 21, 2017, 37 pages.
U.S. Appl. No. 15/411,823 / Non-Final Rejection, dated Jan. 25, 2018, 10 pages.
U.S. Appl. No. 14/968,429 / Response After Final Action, dated Dec. 26, 2017, 28 pages.
U.S. Appl. No. 14/968,429 / Advisory Action, dated Jan. 11, 2018, 5 pages.
U.S. Appl. No. 14/870,744 / Response After Final Action, dated May 30, 2018, 33 pages.
U.S. Appl. No. 14/870,744 / Advisory Action, dated Jul. 3, 2018, 5 pages.
U.S. Appl. No. 14/870,744 / RCE and Amendments, dated Jul. 27, 2018, 33 pages.
U.S. Appl. No. 14/870,744 / Notice of Allowance and Fees Due, dated Sep. 6, 2018, 11 pages.
U.S. Appl. No. 12/573,829 / Final Rejection, dated Jul. 11, 2018, 15 pages.
U.S. Appl. No. 12/573,829 / After Final Consideration Program Request, Sep. 7, 2018, 23 pages.
U.S. Appl. No. 12/573,829 / Advisory Action, dated Sep. 24, 2018, 4 pages.
U.S. Appl. No. 12/573,829 / RCE and Amendments, dated Oct. 9, 2018, 20 pages.
U.S. Appl. No. 15/802,348 / Preliminary Amendment, dated Oct. 26, 2018, 24 pages.
U.S. Appl. No. 12/830,236 / Final Rejection, dated Sep. 5, 2018, 30 pages.
U.S. Appl. No. 12/830,236 / After Final Consideration Program Request, Nov. 5, 2018, 24 pages.
U.S. Appl. No. 14/641,735 / Advisory Action, dated Jun. 8, 2018, 4 pages.
U.S. Appl. No. 14/641,735 / Internet Communications Authorized, Jun. 23, 2018, 2 pages.
U.S. Appl. No. 14/641,735 / RCE and Amendments, dated Jul. 16, 2018, 34 pages.
U.S. Appl. No. 14/641,735 / Preliminary Amendment, dated Oct. 26, 2018, 10 pages.
U.S. Appl. No. 14/641,735 / Non-Final Rejection, dated Nov. 2, 2018, 28 pages.
U.S. Appl. No. 14/596,154 / Issue Notification, Aug. 21, 2018, 1 page.
U.S. Appl. No. 16/048,113 / Application as filed on Jul. 27, 2018, 81 pages.
U.S. Appl. No. 16/048,113/ Filing Receipt, Aug. 24, 2018, 3 pages.
U.S. Appl. No. 16/048,113 / Notice to File Missing Parts, Aug. 24, 2018, 2 pages.
U.S. Appl. No. 15/411,823 / Notice of Allowance and Fees Due, dated Jul. 13, 2018, 8 pages.
U.S. Appl. No. 16/048,113 / Applicant Response to Pre-Exam Formalities Notice and Amendment, dated Oct. 22, 2018, 38 pages.
U.S. Appl. No. 16/048,113 / Filing Receipt, Oct. 24, 2018, 3 pages.
U.S. Appl. No. 16/164,430 / Application as filed Oct. 18, 2018, 79 pages.
U.S. Appl. No. 16/164,430 / Notice to File Missing Parts, Nov. 6, 2018, 2 pages.
U.S. Appl. No. 16/164,430 / Filing Receipt, Nov. 6, 2018, 4 pages.
U.S. Appl. No. 14/968,429 / Amendment after Notice of Allowance, dated May 31, 2018, 12 pages.
U.S. Appl. No. 14/968,429 / Amendment after Notice of Allowance, dated Jun. 13, 2018, 12 pages.
U.S. Appl. No. 14/968,429 / Response to Amendment under Rule 312, dated Jul. 10, 2018, 2 pages.
U.S. Appl. No. 14/968,429 / Response to Amendment under Rule 312, dated Jul. 23, 2018, 2 pages.
U.S. Appl. No. 14/968,429 / Issue Notification, Aug. 1, 2018, 1 page.
U.S. Appl. No. 16/048,061 / Application filed Jul. 27, 2018, 101 pages.
U.S. Appl. No. 16/048,061 / Notice to File Missing Parts, Aug. 13, 2018, 2 pages.
U.S. Appl. No. 16/048,061 / Filing Receipt, Aug. 13, 2018, 4 pages.
U.S. Appl. No. 16/048,061 / Applicant Response to Pre-Exam Formalities Notice, Oct. 12, 2018, 13 pages.
U.S. Appl. No. 16/048,061 / Filing Receipt, Oct. 16, 2018, 4 pages.
U.S. Appl. No. 16/048,061 / Request for Corrected Filing Receipt, Oct. 31, 2018, 6 pages.
U.S. Appl. No. 16/048,061 / Filing Receipt, Nov. 5, 2018, 4 pages.
U.S. Appl. No. 14/870,744 / Notice of Allowance and Fees Due, dated Mar. 12, 2019, 7 pages.
U.S. Appl. No. 14/870,744 / Issue Notification, dated Mar. 20, 2019, 1 page.
U.S. Appl. No. 16/209,872 / Applicant Response to Pre-Exam Formalities Notice, dated Feb. 21, 2019, 17 pages.
U.S. Appl. No. 16/209,872 / Filing Receipt, dated Feb. 26, 2019, 3 pages.
U.S. Appl. No. 15/043,267 / Non-Final Rejection, dated Apr. 2, 2019, 21 pages.
U.S. Appl. No. 15/250,118 / Issue Fee Payment, dated Apr. 5, 2019, 20 pages.
U.S. Appl. No. 12/830,236 / Notice of Allowance and Fees Due, dated Apr. 2, 2019, 15 pages.
U.S. Appl. No. 14/641,735 / Notice of Allowance and Fees Due, dated Apr. 15, 2019, 47 pages.

(56) References Cited

OTHER PUBLICATIONS

U.S. Appl. No. 15/464,205 / Preliminary Amendment, dated Feb. 22, 2019, 11 pages.
U.S. Appl. No. 14/870,744 / Response to Amendment under Rule 312, dated Jan. 9, 2019, 2 pages.
U.S. Appl. No. 16/209,872 / Application as Filed, dated Dec. 4, 2018, 129 pages.
U.S. Appl. No. 16/209,872 / Notice to File Missing Parts, dated Dec. 28, 2018, 2 pages.
U.S. Appl. No. 16/209,872 / Filing Receipt, dated Dec. 28, 2018, 3 pages.
U.S. Appl. No. 15/250,118 / Terminal Disclaimer, dated Dec. 11, 2018, 4 pages.
U.S. Appl. No. 15/250,118 / Notice of Allowance and Fees Due, dated Jan. 8, 2019, 32 pages.
U.S. Appl. No. 15/250,118 / Amendment after Notice of Allowance, dated Jan. 23, 2019, 18 pages.
U.S. Appl. No. 15/802,348 / Non-Final Rejection, dated Feb. 11, 2019, 18 pages.
U.S. Appl. No. 12/830,236 / After Final Consideration Program Decision, dated Nov. 18, 2018, 4 pages.
U.S. Appl. No. 14/641,735 / Amendment/Req. Reconsideration-After Non-Final Reject, dated Feb. 4, 2019, 27 pages.
U.S. Appl. No. 16/048,113 / Notice of Publication, dated Jan. 31, 2019, 1 page.
U.S. Appl. No. 16/164,430 / Applicant Response to Pre-Exam Formalities Notice, dated Jan. 18, 2019, 29 pages.
U.S. Appl. No. 16/164,430 / Filing Receipt, dated Jan. 23, 2019, 4 pages.
U.S. Appl. No. 16/048,061 / Notice of Publication, dated Jan. 24, 2019, 1 page.
U.S. Appl. No. 16/164,535 / Application as filed Oct. 18, 2018, 115 pages.
U.S. Appl. No. 16/164,535 / Filing Receipt, dated Nov. 7, 2018, 4 pages.
U.S. Appl. No. 16/164,535 / Notice to File Corrected Application Papers, dated Nov. 7, 2018, 2 pages.
U.S. Appl. No. 16/164,535 / Applicant Response to Pre-Exam Formalities Notice, dated Jan. 7, 2019, 23 pages.
U.S. Appl. No. 16/164,535 / Filing Receipt, dated Jan. 11, 2019, 4 pages.

* cited by examiner

Rule A (Boolean)

$$410 \begin{cases} [0] \rightarrow \text{empty sequence} \\ [1] \rightarrow (\ ) \end{cases}$$

Rule B (Even)

420 ⟶ [2x] → ( ) [x]

Rule C (Add Non-composite)

430 ⟶ [Q(x)] → ( [x] )

Rule D (Add Composite)

A. If grouping or subgrouping S is empty sequence then Eval (S)=0; if S is ( ) then Eval (S) = 1

B. If grouping or subgrouping S is ( )T then Eval (S) = Eval ( ( )T) = 2 * Eval (T)

C. If grouping or subgrouping S is (T) then Eval (S) =Eval ((T)) = Q (Eval(T))

D. If grouping or subgroping S is UV then Eval (S) = Eval (UV) = Eval (U) * Eval (V)

US 10,411,878 B2

METHOD AND/OR SYSTEM FOR TRANSMITTING AND/OR RECEIVING DATA

This disclosure claims priority pursuant to 35 USC 119(e) from U.S. provisional patent application Ser. No. 60/632,343, filed on Nov. 30, 2004, by LeTourneau, et al., titled, "METHOD AND/OR SYSTEM FOR TRANSMITTING AND/OR RECEIVING DATA," assigned to the assignee of the presently claimed subject matter.

BACKGROUND

This disclosure is related to transmitting data and/or receiving data.

A variety of techniques exist for transmitting and/or receiving data. However, such techniques typically have several disadvantages, including, a limit on the size of the datum that may be transmitted and/or received, such as 32 or 64 bits, for example. Another disadvantage includes the difficulty of synchronization between a receiver and transmitter. Thus, new methods and/or systems for receiving and/or transmitting data continue to be desirable.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

FIG. 4 is a table illustrating an embodiment of operations in which natural numerals are associated with an embodiment of a sequence of binary values;

FIG. 5 is a table illustrating an application of the embodiment of FIG. 4 to a series of natural numerals;

FIG. 6 is a table illustrating an embodiment of an operation that associates non-composite natural numerals with natural numerals;

FIG. 8 is a table illustrating an embodiment of a technique for evaluating binary sequences received, such as those received via the approach illustrated in FIG. 7.

DETAILED DESCRIPTION

Figure 1:
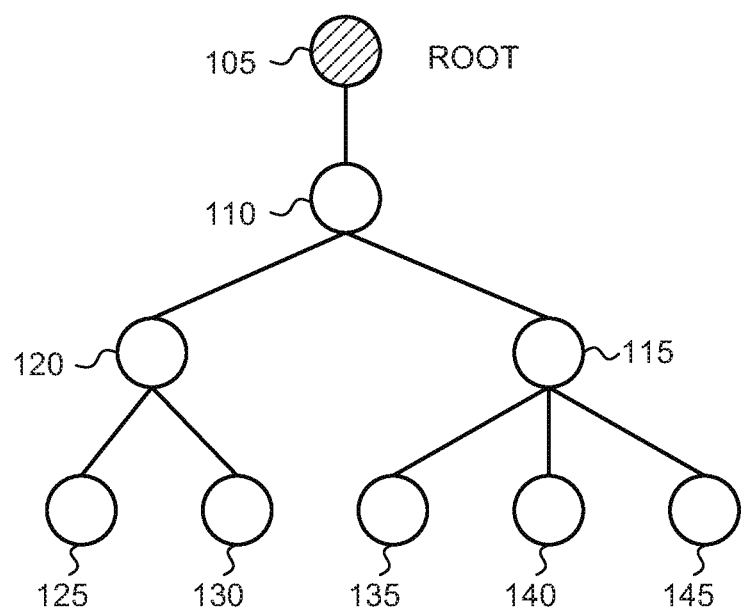
FIG. 1 is a schematic diagram of an embodiment of a tree.

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Some portions of the detailed description which follow are presented in terms of algorithms and/or symbolic representations of operations on data bits or binary digital signals stored within a computing system, such as within a computer or computing system memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient, at times, principally for reasons of common usage, to refer to these signals as bits, data; values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device, that manipulates and/or transforms data represented as physical electronic and/or magnetic quantities and/or other physical quantities within the computing platform's processors, memories, registers, and/or other information storage, transmission, and/or display devices.

In a variety of fields, it is convenient and/or desirable to represent data, a set of data and/or other information in a hierarchical fashion. In this context, such a hierarchy of data shall be referred to as a "tree." In a particular embodiment, a tree may comprise a finite, rooted, connected, acyclic graph. Likewise, such trees may be either ordered or unordered. Here, ordered refers to the notion that there is an ordering or precedence among nodes attached to a common node corresponding to the order of the attached nodes shown in a graphical illustration. An unordered tree is illustrated here, for example, in FIG. 1 by embodiment 100. As illustrated, the root of this particular embodiment encompasses node 105. In addition to 105, there are eight other nodes designated 110 to 145, respectively. Likewise, the nodes are connected by branches referred to, in this context, as edges. Thus, the nodes of this tree are connected by eight edges. This embodiment, therefore, illustrates a finite tree that is rooted by node 105. Furthermore, the nodes are connected, meaning, in this context, that a path exists between any two nodes of the tree. The tree is likewise acyclic, meaning here, that no path in the tree forms a complete loop.

In a variety of contexts, it may be convenient and/or desirable to represent a hierarchy of data and/or other information using a structure, such as the embodiment illustrated in FIG. 1. One particular embodiment, without loss of generality, of a tree may include edges that are labeled with data and/or other values. Likewise, in one particular embodiment, such data and/or values may be limited to a particular set of data. For example, in this context, a binary edge labeled tree refers to a tree in which the data and/or values comprise binary data, that is, in this example, either a binary one or a binary zero. Likewise, alternatively, the edges of a tree may be labeled with one value, or three values. Continuing, the edges may be labeled with four values, five values, etc. In this context, the class of all trees in which the edges are labeled with a specific number of distinct values, that is, in this context, values chosen from a set having a specific number of distinct elements, shall be referred to as edge-labeled trees (ELTs). It is likewise noted that such trees are not limited to being labeled with numerals, such as binary numerals as previously described. Any distinctly identifiable labels may be employed; however, in this context, it shall be understood that employing numerals to label the edges is sufficiently general to encompass any sort of data labels that may be desirable, regardless of their form. For example, and without loss of generality, a table look-up process may be employed to convert between a set of data or other labels and a set of natural numerals.

To reiterate, in this context, a tree comprises an edge labeled tree if each edge of the string or tree respectively stores a value or single piece of data. Likewise, in this context, two nodes are employed to support an edge holding a single piece of data. At this point, it is worth noting that trees having nodes and edges, such as previously described, may be represented in a computing platform or similar computing device through a data structure or a similar mechanism intended to capture the hierarchical relationship of the data, for example. It is intended that all such embodiments are included within the scope of the claimed subject matter.

It is noted that binary edge labeled trees (BELTs) may be listed or enumerated. See, for example, U.S. provisional patent application Ser. No. 60/543,371, titled "Manipulating Sets of Hierarchical Data," filed on Feb. 9, 2004, by J. J. LeTourneau, and assigned to the assignee of the current provisional application. This is illustrated, here, for example, in FIG. 2. It is noted that this particular figure also includes the associated natural numerals. The association of such numerals for this particular embodiment should be clear based at least in part on previously cited U.S. provisional patent application Ser. No. 60/543,371. However, it is, of course, again noted that the claimed subject matter is not limited in scope to employing the approach or approaches described in aforementioned U.S. provisional patent application Ser. No. 60/543,371. U.S. provisional patent application Ser. No. 60/543,371 is provided simply as an example of listing or enumerating unordered BELTs.

Figure 2:
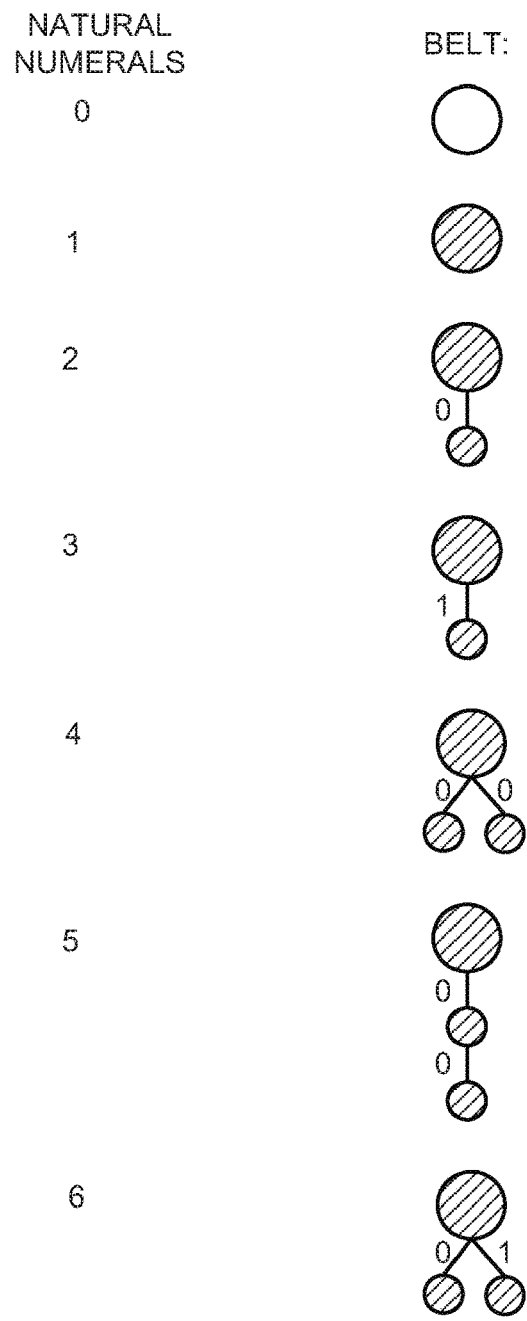
FIG. 2 is a schematic diagram illustrating an embodiment of an association between natural numerals and binary edge labeled trees.

However, for this particular embodiment, although the claimed subject matter is not limited in scope in this respect, a method of enumerating a set of unordered trees may begin with enumeration of an empty binary edge labeled tree and a one node binary edge labeled tree. Thus, the empty tree is associated with the natural numeral zero and has a symbolic representation as illustrated in FIG. 2 (circle). Likewise, the one node tree, which holds no data, is associated with the natural numeral one and has a graphical representation of a single node. For higher positive natural numbers, ordered trees may be generated by a process described, for example, in "The Lexicographic Generation of Ordered Trees," by S. Zaks, The Journal of Theoretical Computer Science, Vol. 10(1), pp 63-82, 1980, or, "Enumerating Ordered Trees Lexicographically," by M. C. Er, Computation Journal, Vol. 28, Issue 5, pp 538-542, 1985. This may be illustrated, for example in FIG. 2, as described in more detail below.

As illustrated, for this particular embodiment, and as previously described, the empty tree has zero nodes and is associated with the natural numeral zero. Likewise, the one node tree root comprises a single node and is associated with the natural numeral one. Thus, to obtain the tree at position two, a root node is attached and connected to the prior root node by an edge. Likewise, here, by convention, the edge is labeled with a binary zero. If, however, the tree formed by the immediately proceeding approach were present in the prior enumeration of trees, then a similar process embodiment is followed, but, instead, the new edge is labeled with a binary one rather than a binary zero. Thus, for example, to obtain the binary edge labeled tree for position three, a new root node is connected to the root node by an edge and that edge is labeled with a binary one.

Continuing with this example, to obtain the binary edge labeled tree for position four, observe that numeral four is the product of numeral two times numeral two. Thus, a union is formed at the root of two trees, where, here, each of those trees is associated with the positive natural numeral two. Likewise, to obtain the binary edge labeled tree for position five, begin with the binary edge labeled tree for position two and follow the previously articulated approach of adding a root and an edge and labeling it with a binary zero.

In this context, adding a root node and an edge and labeling it binary zero is referred to as a "zero-push" operation and adding a root node and an edge and labeling it binary one is referred to as a "one-push" operation. Thus, referring again to FIG. 2, the one-push of the root tree is the tree at position three. This follows from FIG. 9 of previously referenced U.S. provisional patent application Ser. No. 60/543,371, since $Q((1*2)-1)=Q(1)=3$. Likewise, the tree at position five is the zero-push of the tree at position 2. Again, this follows from FIG. 9 of the previously referenced US provisional patent application, since $Q((2*2)-2)=Q(2)=5$.

In the embodiment just described, binary edge labeled trees use binary numerals "0" and "1." However, as previously suggested, the claimed subject matter is not limited in scope to binary edge labeled trees. For example, trees may employ any finite number of numeral combinations as labels, such as a unitary value, triplets, quadruplets, etc. Thus, using a quadruplet example, it is possible to construct trees, such as a zero-push of a particular tree, a one-push of that tree, a two-push of that tree, and a three-push of that tree. Thus, for such trees, edges may be labeled 0, 1, 2 or 3, etc., for example.

Figure 3:
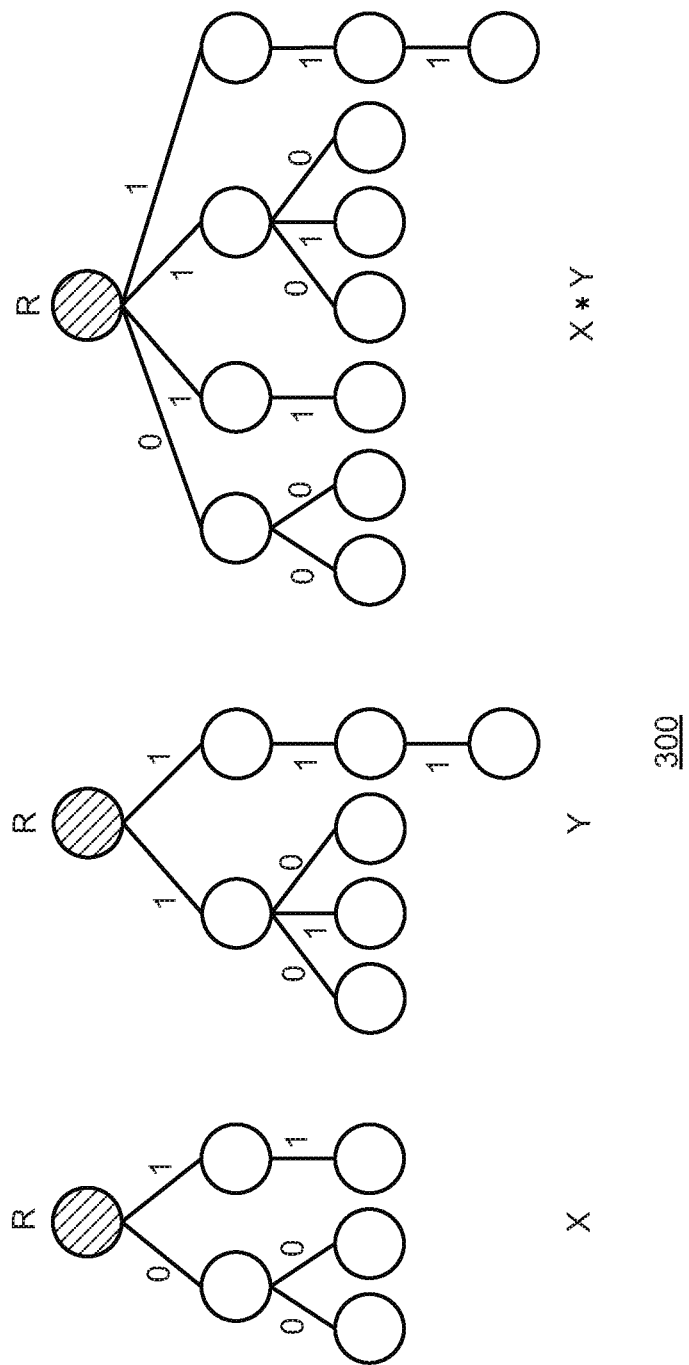
FIG. 3 is a schematic diagram illustrating an embodiment of an operation applied to an embodiment of two binary edge labeled trees.

The foregoing discussion has begun to characterize an algebra involving trees, in this particular embodiment, an algebra for unordered edge labeled trees or unordered ELTs, such as BELTs. The foregoing discussion defines a value zero, a zero node tree for this particular embodiment, a value one, a one node tree for this particular embodiment, and monadic operations, previously described as a zero-push and a one-push. For this particular embodiment, an additional operation may be characterized, a "merger" operation. The merger operation with respect to trees refers to merging two trees at their roots. This operation is illustrated, for example, in FIG. 3.

As will now be appreciated, the merger operation comprises a binary operator. Likewise, the constants zero/one, referred to above, may be viewed as an operation having no argument or as a zero valued argument operator or operation. Thus, this operation, in effect, returns the same value whenever applied. Here, for this particular embodiment, the constant value, or zero valued argument operation returns "c" and is denoted as "c." The merger operator is denoted as "*" and here comprises a binary operation. In contrast, in U.S. provisional patent application No. 60/575,784, titled "Method and/or System for Simplifying Tree Expressions, such as for Pattern Matching," filed May 28, 2004, by J. J. LeTourneau, assigned to the assignee of the current application, monadic operators were employed, referred to as successor operators, using the symbol $S(x)$, much like the push operations previously described.

Previously, an embodiment for manipulating binary edge labeled trees or BELTs was described in connection with U.S. provisional patent application 60/543,371. In that context, binary edge labeled trees comprise finite rooted, unordered two valued edge labeled trees. Thus, for the particular embodiment of binary edge labeled trees described, the two values comprise "0" and "1," although alternately they could comprise A and B, for example, or any other two values. Likewise, previously, in U.S. provisional application 60/543,371, an embodiment was demonstrated in which an association existed between natural numerals and binary edge labeled trees. For this particular embodiment, similar associations also exist, here between any N valued edge labeled tree and the natural numerals, where N is a numeral. Of course, many different associations are possible and the claimed subject matter is intended to cover all such associations regardless of the particular embodiment. Thus, for example, three valued edge label trees may be converted to numerals, four valued edge labeled trees may be converted to numerals and so forth. Thus, manipulations, such as those previously described, for example, in aforementioned provisional U.S. patent application 60/543,371, as well as additional manipulations, may be applied to N valued edge labeled trees, as described in more detail hereinafter. See, for example, U.S. provisional patent application Ser. No. 60/623,280, titled "METHOD AND/OR SYSTEM FOR MANIPULATING TREE EXPRESSIONS" filed on Oct. 29, 2004, by J. J. LeTourneau, and U.S. provisional patent application Ser. No. 60/623,352 titled "METHOD AND/OR SYSTEM FOR TAGGING TREES" filed on Oct. 29, 2004, by J. J. LeTourneau; both of the foregoing assigned to the assignee of the current provisional patent application.

As suggested in previously referenced U.S. provisional application 60/543,371, in one particular embodiment, when converting between binary edge labeled trees and numerals, a relationship was found to exist between a "push" operation and non-composite numerals. Thus, in this context, it may be convenient to define an operation indexed by the natural numerals that provides in ascending order the non-composite numerals, although, of course, the claimed subject matter is not limited in scope in this respect. Such an operation is depicted specifically in FIG. 6. As described in more detail hereinafter, this operation is also convenient in this context in connection with unitary edge labeled trees.

As previously suggested in aforementioned U.S. provisional patent application no. 60/575,784, a set of congruence operations on a set of tree expressions may be isomorphic to a set of finite, rooted, unordered binary edge labeled trees. Thus, or more particularly, under such an isomorphism, in the particular embodiment, a one-to-one relationship between the equivalence classes that satisfy the tree expressions and the finite, rooted, ordered binary edge labeled trees may exist.

It is likewise noted that, for this particular embodiment, one way of manipulating an edge labeled tree is to apply a push operation to the edge labeled tree. Likewise, as previously described, for this embodiment, a push operation comprises adding an edge and labeling it. For this embodiment, the labels for the edge labeled tree comprise numerals. Of course, this is merely one potential embodiment and the claimed subject matter is not limited in scope in this respect. For example, as previously described, letters may be employed. Likewise, any set of values where each value is distinct may be employed and remain within the scope of the claimed subject matter. Furthermore, a similar set of manipulations may be applied to node labeled trees rather than edge labeled trees. Likewise, a push operation may be applied to a node labeled tree, as previously described for edge labeled trees.

Additional uses of the previously described embodiment also exist, although the claimed subject matter is not limited in scope to a particular embodiment. For example, in one embodiment, FIG. 5 provides an embodiment of an association between natural numerals, on the left-hand side of FIG. 5, and a set of binary-valued strings or binary sequences, on the right-hand side of FIG. 5. Of course, as has been previously indicated, the claimed subject matter is not limited in scope to this particular association embodiment and many other association embodiments are included within the scope of the claimed subject matter. Nonetheless, there are aspects of this particular embodiment worthy of further discussion. For example, FIG. 4 provides a set of rules that permit conversion between the natural numerals and this particular association embodiment of sequences. Again, it is noted that the claimed subject matter is not limited in scope to this particular embodiment. However, as shall be discussed in more detail hereinafter, a feature of this particular embodiment is the ability to represent push operations and merger operations, such as those previously described in connection with edge labeled trees, using strings or sequences, here binary-valued strings or sequences.

FIG. 4 provides for this embodiment a set of rules for converting natural numerals to binary-valued strings. In this context, for FIGS. 4 and 5, a numeral with brackets, such as [X], is intended here to denote the binary sequence for X. As illustrated, and as is similar to the approach previously employed in conjunction with edge labeled trees, the numeral 0 is assigned an empty string, whereas the numeral 1 is assigned a pair of corresponding left-right brackets or parentheses (It is noted that the terms brackets and parentheses used interchangeably). This is indicated by expression 410. It is likewise noted that, in this context, the numeral zero is included when referring to the natural numerals. Likewise, as is illustrated by expression 420 in FIG. 4, a non-zero numeral that is two times the numeral X is represented as the string or sequence for X plus an extra set of left-right brackets or parentheses in front of the string or sequence for the numeral X. Likewise, expression 430, denoted the odd non-composite rule, is similar in concept to a push operation, previously described in connection with edge labeled trees. If a natural numeral is a non-composite numeral, it is assigned the string or sequence for the natural number index of that non-composite, as defined by the operation shown in FIG. 6, but then surrounded by an additional left-hand bracket on the left-hand side and an additional right hand bracket on the right-hand side, as depicted in FIG. 4. Further, expression 440 comprises the merger rule in which the multiplication of two natural numerals is simply the combination of the strings or sequences for those natural numerals represented side by side or adjacent to one another. It is further noted, although the claimed subject matter is not limited in scope in this respect, that a convention may be introduced to ensure that a unique association exists between particular numerals and strings. For example, one such convention may be that the smaller of the two numerals is the string or sequence on the left, for example, although, the claimed subject matter is not limited in scope to such a particular approach. From these rules, it is possible to construct the binary-valued sequences shown in FIG. 5 that correspond with the natural numerals. Again, it is noted that this is a particular association embodiment and the claimed subject matter is not limited in scope in this respect. Thus any one of a number of other rules for constructing sequences might have been employed and remain within the scope of the claimed subject matter.

A feature of this embodiment, although the claimed subject matter is not limited in scope in this respect, is that the binary-valued sequences shown in FIG. 5 may likewise be associated with unitary edge labeled trees, that is, trees that employ a single unitary label for all of the edges of the tree. To be more specific, the set of distinct values from which labels for edges are chosen is a set of one value only in such an embodiment. Alternatively, such trees need not have their edges labeled with any value since in such an embodiment the value is the same for all edges. Here, such an edge labeled tree may be converted to, for example, for this particular embodiment, a binary-valued string corresponding the edge labeled tree and the string may be manipulated in place of manipulating a corresponding natural numeral.

Thus, this particular embodiment provides an approach in which unitary edge labeled trees may be manipulated by converting to natural numerals, manipulating the natural numerals, and converting back to unitary edge labeled trees. See, for example, U.S. provisional patent application Ser. No. 60/623,280 titled "METHOD AND/OR SYSTEM FOR MANIPULATING TREE EXPRESSIONS filed on Oct. 29, 2004, by J. J. LeTourneau, and U.S. provisional patent application Ser. No. 60/623,352, titled "METHOD AND/OR SYSTEM FOR TAGGING TREES filed on Oct. 29, 2004, by J. J. LeTourneau; both of the foregoing assigned to the assignee of the current provisional patent application. Furthermore, unitary edge labeled trees may be manipulated by converting to corresponding binary-valued strings, manipulating the strings, and then converting back to unitary edge labeled trees. It is noted that the claimed subject matter is not limited to these particular approaches or to employing any one of these approaches alone. The desirability of the approach will vary with a variety of potential factors, including storage capabilities, processing capabilities, the particular application and the like.

In yet another embodiment in accordance with the claimed subject matter, a sequence of natural numerals may be converted to a binary sequence representing trees of finite size, such as unitary trees. As shall be discussed in more detail hereinafter, additionally padding values may be imbedded or added between the portion of the sequence that represents natural numerals, also referred to as data or signal information in this particular context. The resulting sequence may then be transmitted. Likewise, the binary sequence representing natural numerals in the form of finite trees plus padding values may be received and then converted into the sequence of natural numerals at the receiving end.

Thus, although the claimed subject matter is not limited in scope in this respect, this particular embodiment provides a technique for transmitting a finite sequence of natural numerals by employing two values, referred to in this context as a binary sequence or a binary-valued string. It is noted that these values may comprise "0" and "1" as is conventionally employed in connection with digital systems, although, of course, the claimed subject matter is not limited in scope in this respect. Instead, for this particular embodiment, and as illustrated in connection with FIG. 4, "0" shall comprise a left parenthesis, denoted "(", and "1" shall comprise a right parenthesis, denoted ")", for this particular embodiment. Nonetheless, as is understood, there is no loss of generality by employing this value replacement for the purposes of this particular embodiment.

Figure 7:
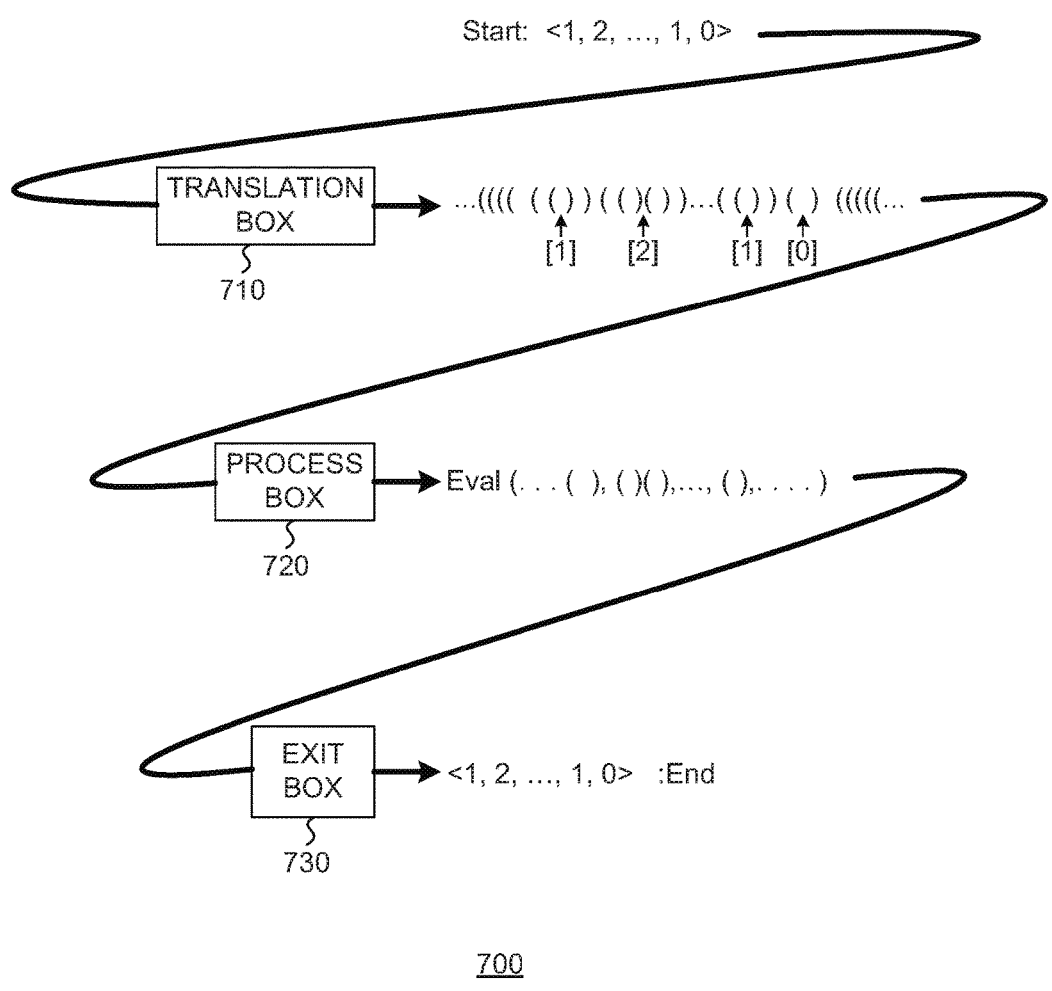
FIG. 7 is a schematic diagram illustrating an embodiment of a technique for transmitting natural numerals using binary sequences.

FIG. 7 is a schematic diagram illustrating an example of this particular embodiment. Thus, as illustrated, a finite sequence of natural numerals, designated for example as 1, 2, . . . , 1, 0 are translated, depicted here by box 710 in FIG. 7. This translation may be implemented using a table look up, for example, applying the approach previously described with respect FIGS. 4 and 5. Alternatively, of course, instead, the previously described approach may be implemented by a computing platform programmed to determine the desired binary sequence representation for a natural numeral, computed, for example, as previously described, from a finite tree, such as a unitary tree for this particular embodiment.

Although the claimed subject matter is not limited in scope in this respect, as suggested, one technique for implementing this approach may be to apply a table look up approach. Techniques for performing table look-ups are well-known and well-understood. Thus, this will not be discussed in detail here. However, it shall be appreciated that any and all of the previously described and/or later described processing, operations, conversions, transformations, manipulations, etc. of strings, trees, numerals, data, etc. may be performed on one or more computing platforms or similar computing devices, such as those that may include a memory to store a table as just described, although, the claimed subject matter is not necessarily limited in scope to this particular approach. Thus, for example, a hierarchy of data, such as a tree as previously described, for example, may be formed. Likewise, operations and/or manipulations, as described, may be performed; however, operations and/or manipulations in addition to those described or instead of those described may also be applied. It is intended that the claimed subject matter cover all such embodiments.

Additionally, padding values may be imbedded or inserted between representations of the particular natural numerals, here, the particular binary representations for the particular trees. In this particular embodiment, such a padding value comprises a left parenthesis, although, of course, the claimed subject matter is not limited in scope in this respect. It is noted that, for this embodiment, an arbitrary amount of padding may be inserted between the representations of the natural numerals to be transmitted. As discussed in more detail, this is one desirable aspect of this particular embodiment. Although the claimed subject matter is not limited in scope in this respect, such padding may be inserted between such representations, as depicted by process box 720 in FIG. 7. It is this combined binary sequence that then may be transmitted across a transmission media or communications channel. This binary sequence may then be received at a receiver which may then be employed, as depicted by box 730, to convert the binary sequence back into the natural numerals, as described in more detail below, for this particular embodiment.

It is noted that this particular embodiment has a number of desirable properties associated with it. For example, natural numerals may be transmitted in any multiplicity and in any order. Likewise, although the previous discussion suggests the communication of natural numerals, in an alternate embodiment, a table look up may be employed at each end of a communications channel to permit communication of other information other than natural numerals. For example, natural numerals may represent other information to be communicated and a table look up process at the receiving end and transmitting end may be employed to perform the conversion prior to transmission and after reception. Likewise, in FIG. 7, the particular binary sequence is illustrated as being applied to process box 720 in reverse order, so that the sequence is "read" right to left here, although this is merely one embodiment and, alternatively, the binary sequence may be applied to process box 720 without employing this reverse order.

As previously indicated, in this particular embodiment, right parenthesis or right bracket and left parenthesis or left bracket in place of the conventional binary values "0" and "1"; however, the claimed subject matter is not limited in this respect. Likewise, for the embodiment illustrated in FIG. 7, as illustrated and discussed in more detail later, a sequence of values is read right to left, although, of course, the claimed subject matter is not limited in scope in this respect. Thus, on the receiver side of the communications channel, if a right parenthesis is received, this indicates the start of a sequence of data or signal information. Alternatively, if a left parenthesis is received this indicates padding unless a right parenthesis is received first that corresponds to the left parenthesis. One way to implement this, although, of course, the claimed subject matter is not limited in scope in this respect, is by assigning a minus one (−1) to a left parenthesis or bracket and a plus one (+1) to a right parenthesis or bracket. Thus, by accumulating values as parentheses are received, encountering zero may be employed to indicate or synchronize the beginning of a binary sequence of data. This approach has a number of potential advantages, although the claimed subject matter is not limited in scope to this approach or to possessing the particular advantages of a particular embodiment.

An effect of this accumulation approach is to match binary values in this particular embodiment, such as matching a left parenthesis with a corresponding right parenthesis. Once the accumulation equals zero, the receiver recognizes that it has received signal information, in this particular embodiment, a binary sequence representing a natural numeral. In this context, the term signal information generally refers to data to be transmitted across a communications channel. Thus, a first right parenthesis is a wake up signal to the receiver and a corresponding left parenthesis signals the end of a grouping of signal information. Likewise, if zero is reached again, this allows the receiver to recognize that signal information has been communicated. Otherwise, what is received represents padding values that may be inserted between groupings of signal information. Of course, for this embodiment, the particular groupings represent particular natural numerals. Likewise, with this mechanism, referring to FIG. 5, if nothing, that is, no additional values, is received between corresponding binary values, such as left and right parenthesis, this signifies the natural numeral zero in this embodiment using the empty sequence of empty string. Alternately, the natural numeral one and the remaining natural numerals may be indicated by receiving a sequence of binary values or right and left parentheses, such as those indicated in FIG. 5, between a first set of corresponding binary values, such as between a right and a left parenthesis, although the claimed subject matter is not limited in scope in this respect. As the previous discussion in FIG. 5 indicates, a particular grouping of signal information will not be completely received until the accumulation at the receiver equals zero. This is a signal in this embodiment to the receiver that a grouping of binary values that represents a discrete natural numeral has been received between a set of corresponding binary values, such as, for this embodiment, a right parenthesis and a left parenthesis.

One technique, although the claimed subject matter is not limited in scope in this respect, to determine whether a portion of a binary sequence is padding or signal information is based at least in part on the amount that has been accumulated at the time a particular binary value is received. For example, using the convention previously described, if the accumulation is negative, that indicates data or signal information is currently being received; however, if the accumulation is positive, that indicates padding, such as, for one embodiment, for example, control signal information, is currently being received.

This particular technique or embodiment has a number of useful properties, although the claimed subject matter is not limited in scope to this particular embodiment. For example, a natural numeral of any particular size may be transmitted across a communications channel. Thus, communication of a natural numeral is not limited by a buffer size or register size, such as 32 bits or 64 bits. Likewise, similarly, arbitrarily-sized padding or breaks may be employed between natural numerals. In addition, as the previous discussion illustrates, for this particular embodiment, the binary sequence is self-synchronizing. More specifically, the receiver becomes synchronized whenever zero is reached during accumulation, as previously described. This provides an advantage over other types of approaches in which synchronizing signals are transmitted separately from the data.

It is likewise noted that the ability to provide arbitrary padding or breaks between signal information provides a number of different potential capabilities, although the following examples are not intended to limit the scope of the claimed subject matter in any way. For example, it may be possible to use padding between groupings of binary values to communicate control signals, such as, in one example, potential multiplexing of the sequence signal information. In this particular context, the term control signals or control signal information refers to signal information that is not data to be communicated, For example, the padding could designate different processors or other hardware that are to receive and/or process a particular portion of the binary sequences received. Likewise, if several independent binary sequences are transmitted separately, the self-synchronizing capability previously described provides the capability for the independent sequences to become cross-synchronized, even, for example, if received by different receivers. Likewise, alternately, such padding may provide other control signal information, such as encryption keys that may be employed in any one of a variety of possible encryptions schemes. Likewise, such padding values may be employed for watermarking or authentication of received binary sequences. Again, these are just a few examples of possible uses of the padding values in connection with a binary sequence as described in this particular embodiment. Alternately, such padding could provide "context control," such as, for example, depending upon the particular context, using padding to provide control signal information designating or indicating the meaning of the data or signal information that is being received. Perhaps, for example, without intending to limit the scope of the claim subject matter, each natural numeral, or at least some of the natural numerals being transmitted, represents data for a different purpose at the receiving end of a communications channel. Likewise, depending on the particular environment, it may be possible to insert real time information in place of padding values as binary sequences are transmitted between different points or nodes, for example. This may be useful, for example, if there are delays or other communication system performance information, for example, that it is desirable to capture in real time in a string of communication transmissions, for example. Likewise, another application may include inserting error correction coding into the binary sequence so as not to disturb the data being transmitted.

In still yet another embodiment, content signal information may be provided by padding values. Examples, without limitation include: audio signal information, video signal information, picture signal information, VoIP encoding signal information, or other information about the content of the sequence.

In yet another embodiment, although, again, the claimed subject matter is not limited in scope in this respect, compression may be applied. For example, if natural numerals are to be transmitted, the particular natural numbers may be factored into non-composite numerals and indices for the non-composite numerals, such as those indicated in FIG. 6, for example, may be represented in the binary sequence, potentially reducing the number of total binary values to be transmitted.

An aspect of this particular embodiment also relates to converting from the binary sequence acquired at the receiver to a sequence of natural numerals. Of course, for this particular embodiment, data or signal information and padding values are separated. Likewise padding values are then ignored at least for the purposes of determining the natural numerals that were transmitted. As previously described, one approach may be to employ a look up table containing information, such as that illustrated in FIG. 5. In an alternate embodiment, however, it may be possible to, instead, determine the associated natural numeral with the received binary sequence through computation. This may be accomplished, for this particular embodiment, in a manner similar to an inverse of the approach depicted in FIG. 4.

Once a grouping of sequence values representing a particular natural numeral, or representing a particular tree (that corresponds to a particular natural numeral) is received, using the approach described above, for example, for this particular embodiment, that grouping is evaluated.

For example, as previously suggested for this particular embodiment, if the grouping is empty, this indicates the natural numeral 0. Here, of course, this refers to receiving one set of corresponding binary values for synchronization, such as a right and left parenthesis. However, if a single right parenthesis and a single corresponding left parenthesis is between the one set of corresponding binary values providing synchronization, here a corresponding right and left parenthesis, for this particular embodiment, this indicates the natural numeral 1. If the grouping contains anything else, in this embodiment, further evaluation is performed on the values between the corresponding right and left parentheses, as described in more detail below.

Within or between the first set of corresponding right and left parentheses is a subgrouping of values. If the subgrouping is not one of the possibilities discussed immediately above (e.g., empty or a right-left pair, for example), three other possibilities remain for this particular embodiment. First, there may be second set of corresponding right and left parentheses that contain a subgrouping of values. Second, there may be a second set of corresponding right and left parentheses immediately preceding a subgrouping of values. Third, there may be two self-contained or complete subgroupings of binary values side-by-side.

These possibilities are depicted in FIG. 8. In this particular context, the term grouping refers to the longest sequence of consecutive binary values out of a sequence that taken as a whole represents a single natural numeral. The term subgrouping refers to a sequential portion of binary values that is a subset of a grouping. It is noted that a grouping may contain subgroupings that represent natural numerals; likewise, a subgrouping may contain smaller subportions that also represent a natural numeral. Thus, in a recursive fashion, the grouping and then the subgroupings are evaluated using the approach illustrated, for this embodiment, in FIG. 8, until a natural numeral is determined for a complete grouping.

Of course, the claimed subject matter is not limited to unordered edge labeled trees. For example, as described in previously cited U.S. provisional patent application 60/543,371, binary edge labeled trees and binary node labeled trees may be employed nearly interchangeably to represent substantially the same hierarchy of data. In particular, a binary node labeled tree may be associated with a binary edge labeled tree where the nodes of the binary node labeled tree take the same values as the edges of the binary edge labeled tree, except that the root node of the binary node labeled tree may comprise a node having a zero value or a null value. Thus, rather than employing edge labeled trees (ELTs), the previously described embodiments may alternatively be performed using node labeled trees (NLTs). As one example embodiment, operations and/or manipulations may be employed using edge labeled trees and the resulting edge labeled tree may be converted to a node labeled tree. However, in another embodiment; operations and/or manipulations may be performed directly using node labeled trees.

In accordance with the claimed subject matter, therefore, any tree, regardless of whether it is edge labeled, node labeled; non-binary; a feature tree, or otherwise, may be manipulated and/or operated upon in a manner similar to the approach of the previously described embodiments. However, for convenience, without intending to limit the scope of the claimed subject matter in any way, here, operations and/or manipulations and the like have been described primarily in the context of unitary trees. See, for example, U.S. provisional patent application Ser. No. 60/543,371 titled "Manipulating Sets of Hierarchical Data," filed on Feb. 9, 2004, by J. J. LeTourneau, and assigned to the assignee of the current provisional application.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive. For example, a display may be employed to display one or more queries, such as those that may be interrelated, and or one or more tree expressions, although, again, the claimed subject matter is not limited in scope to this example.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

The invention claimed is:

1. A method of executing computer instructions, the method comprising:
   accessing instructions from one or more physical memory devices for execution by one or more processors;
   executing instructions accessed from the one or more physical memory devices by the one or more processors;
   storing, in at least one of the physical memory devices, signal values resulting from having executed the instructions on the one or more processors;
   wherein the accessed instructions to communicate a sequence of binary values; and
   wherein executing the sequence communication instructions further comprising:
   communicating via a communications channel a sequence of binary values in the form of digital electronic signals, the digital electronic signals comprising content signals;
   the sequence comprising a sequence of finite labeled tree structures in the form of the sequence of binary values and the sequence of the finite labeled tree structures representing content,
   wherein the sequence of binary values further comprises a sequence to synchronize the transmitting and receiving ends of the communications channel; and
   wherein the content signals comprise at least one of the following content signals: audio content signals; video content signals; picture content signals; alphanumerical string content signals; or VoIP content signals.

2. The method of claim 1, wherein the finite labeled tree structures are represented as natural numerals in the form of digital electronic signals.

3. The method of claim 2, wherein one or more table look up operations converts between natural numerals in the form of digital electronic signals and finite labeled tree structures in the form of digital electronic signals.

4. The method of claim 1, wherein the sequence of binary signals further represents tree operations on the finite labeled tree structures and wherein the tree operations include one or more merger operations.

5. The method of claim 1, wherein the sequence of binary values comprises padding values between two or more representations of a finite labeled tree structure in the sequence of binary values.

6. The method of claim 1, the sequence further comprising control signals.

7. The method of claim 1, wherein the sequence of binary signals further represents tree operations on the finite labeled tree structures and wherein the tree operations include one or more operations having no argument.

8. The method of claim 1, wherein the sequence comprises a self-synchronizing sequence.

9. The method of claim 1, wherein the sequence comprises a cross-synchronizing sequence.

10. An article comprising:
    a non-transitory storage medium comprising instructions stored thereon:
    wherein the instructions being accessible from the non-transitory storage medium to store as physical memory states on one or more physical memory devices, the one or more physical memory devices coupled to one or more processors able to execute the instructions stored as physical memory states, the one or more physical memory devices also able to store binary digital signal quantities, if any, as physical memory states, that are to result from execution of the instructions on the one or more processors,
    wherein the executable instructions to communicate a sequence of binary values; and
    wherein the sequence communication instructions further to:
    communicate via a communications channel a sequence of binary values in the form of digital electronic signals, the digital electronic signals comprising content signals;
    the sequence to comprise a sequence of finite labeled tree structures in the form of the sequence of binary values and the sequence of the finite labeled tree structures to represent content,
    wherein the sequence to further comprise a sequence to synchronize the transmitting and receiving ends of the communications channel and
    wherein the content signals to comprise at least one of the following content signals: audio content signals; video content signals; picture content signals; alphanumerical string content signals or VoIP encoding content signals.

11. The article of claim 10, wherein the sequence to comprise a self-synchronizing sequence.

12. The article of claim 10, wherein the sequence to comprise a cross-synchronizing sequence.

13. The article of claim 10, wherein the sequence of binary values further to comprise control signals.

14. The article of claim 10, the instructions being further executable by the one or more processors to result in conversion between finite labeled tree structures and natural numerals in the form of digital electronic signals.

15. The article of claim 14, the instructions being further executable by the one or more processors so that one or more table look up operations is to result in the conversion between the natural numerals in the form of digital electronic signals and the finite labeled tree structures in the form of digital electronic signals.

16. The article of claim 10, the instructions being further executable by the one or more processors to result in the sequence of binary signals further to represent tree operations on the finite labeled tree structures and the tree operations to comprise one or more merger operations.

17. The article of claim 10, the instructions being further executable by the one or more processors to result in the sequence of binary signals further to represent tree operations on the finite labeled tree structures and the tree operations to comprise one or more operations having no argument.

18. The article of claim 10, the instructions being further executable by the one or more processors to result in the sequence of binary values to comprise padding values between two or more representations of a finite labeled tree structure in the sequence of binary values.

19. An apparatus comprising:
one or more processors coupled to one or more physical memory devices to store executable instructions and to store binary digital storage quantities as physical memory states, wherein the executable instructions being accessible from the one or more physical memory devices for execution by one or more processors; and
the one or more processors able to store in at least one of the physical memory devices, binary digital signal quantities, if any, that are to result from execution of the instructions on the one or more processors, wherein the accessed executable instructions to communicate a sequence of binary values; and
wherein the sequence communication instructions further to:
communicate via a communications channel a sequence of binary values in the form of digital electronic signals, the digital electronic signals to comprise content signals;
the sequence to comprise a sequence of finite labeled tree structures in the form of the sequence of binary values and the sequence of the finite labeled tree structures to represent content,
wherein the sequence of binary values further to comprise a sequence to synchronize the transmitting and receiving ends of the communications channel; and
wherein the content signals comprise at least one of the following content signals: audio content signals; video content signals; picture content signals; alphanumerical string content signals; or VoIP encoding content signals.

20. The apparatus of claim 19, wherein the sequence to comprise a self-synchronizing sequence.

21. The apparatus of claim 19, wherein the sequence to comprise a cross-synchronizing sequence.

22. The apparatus of claim 19, wherein the sequence of binary values further to comprise control signals.

23. The apparatus of claim 19, wherein the finite labeled tree structures to comprise natural numerals in the form of digital electronic signals.

24. The apparatus of claim 23, wherein the sequence communication instructions further to be executable so that one or more table look up operations is to result in a conversion between natural numerals in the form of digital electronic signals and finite labeled tree structures in the form of digital electronic signals to comprise a table lookup operation.

25. The apparatus of claim 19, wherein the sequence communication instructions further to communicate a sequence of binary signals which are to represent tree operations on the finite labeled tree structures and the tree operations are to comprise one or more merger operations.

26. The apparatus of claim 19, wherein the sequence communication instructions further to communicate a sequence of binary signals which are to represent tree operations on the finite labeled tree structures and the tree operations are to comprise one or more operations having no argument.

27. The apparatus of claim 19, wherein the sequence communication instructions further to communicate a sequence of binary values in which the sequence of binary values to include padding values between two or more representations of a finite labeled tree structure in the sequence of binary values.

28. An apparatus to communicate a sequence of binary values to represent a sequence of finite labeled trees, the apparatus comprising:
means for accessing instructions from one or more physical memory devices for execution by one or more processors;
means for executing instructions accessed from the one or more physical memory devices by the one or more processors;
means for storing, in at least one of the physical memory devices, signal values resulting from having executed the instructions on the one or more processors;
wherein the accessed instructions to communicate a sequence of binary values; and
wherein the means for executing the sequence communication instructions comprises:
means for communicating via a communications channel a sequence of binary values in the form of digital electronic signals, the digital electronic signals comprising content signals;
the sequence comprising a sequence of finite labeled tree structures in the form of the sequence of binary values and the sequence of the finite labeled tree structures representing content,
wherein the sequence of binary values further comprises a sequence to synchronize the transmitting and receiving ends of the communications channel; and
wherein the content signals comprise at least one of the following content signals: audio content signals; video content signals; picture content signals; alphanumerical string content signals; or VoIP encoding content signals.

29. The apparatus of claim 28, wherein the sequence comprises a self-synchronizing sequence.

30. The apparatus of claim 28, wherein the sequence comprises a cross-synchronizing sequence.

31. The apparatus of claim 28, wherein the finite labeled tree structures comprises natural numerals in the form of digital electronic signals.

32. The apparatus of claim 31, wherein the means for executing the sequence communication instructions further comprises means for converting between natural numerals in the form of digital electronic signals and finite labeled tree structures in the form of digital electronic signals via one or more table lookup operations.

33. The apparatus of claim 28, wherein the sequence of binary signals further represents tree operations on the finite labeled tree structures and the tree operations comprises one or more merger operations.

34. The apparatus of claim 28, wherein the sequence of binary signals further represents tree operations on the finite labeled tree structures and the tree operations comprises one or more operations having no argument.

35. The apparatus of claim 28, wherein the sequence of binary values comprises padding values between two or more representations of a finite labeled tree structure in the sequence of binary values.

* * * * *